(12) United States Patent
Sugimoto

(10) Patent No.: US 9,760,168 B2
(45) Date of Patent: Sep. 12, 2017

(54) GUIDANCE INFORMATION DISPLAY DEVICE

(71) Applicant: Konica Minolta, Inc., Tokyo (JP)

(72) Inventor: Yasuaki Sugimoto, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/067,604

(22) Filed: Oct. 30, 2013

(65) Prior Publication Data

US 2014/0126018 A1 May 8, 2014

(30) Foreign Application Priority Data

Nov. 6, 2012 (JP) .................................. 2012-244593

(51) Int. Cl.
*H04N 1/00* (2006.01)
*G06F 3/01* (2006.01)
(Continued)

(52) U.S. Cl.
CPC ........... *G06F 3/013* (2013.01); *G02B 27/017* (2013.01); *G06F 1/163* (2013.01); *G06F 3/005* (2013.01); *G06F 3/017* (2013.01); *G06F 3/1204* (2013.01); *G06F 3/128* (2013.01); *G06F 3/1253* (2013.01); *G06F 3/1256* (2013.01); *H04N 1/0044* (2013.01); *H04N 1/00129* (2013.01); *H04N 1/00251* (2013.01); *H04N 1/00408* (2013.01); *H04N 1/00493* (2013.01); *H04N 1/00503* (2013.01); *H04N 1/00803* (2013.01); *H04N 1/00806* (2013.01); *H04N 1/00809* (2013.01); *H04N 1/00811* (2013.01); *H04N 1/00814* (2013.01); *H04N 1/00824* (2013.01);
(Continued)

(58) Field of Classification Search
None
See application file for complete search history.

(56) References Cited

U.S. PATENT DOCUMENTS 5,950,045 A * 9/1999 Nomura ................ G06F 9/4446
345/173
6,118,888 A * 9/2000 Chino ..................... G06F 3/011
382/118
(Continued)

FOREIGN PATENT DOCUMENTS

EP 2372495 A2 10/2011
JP H08190640 A 7/1996
(Continued)

OTHER PUBLICATIONS

European Search Report issued in counterpart European Application No. 13189682.1, mailed Mar. 21, 2014 (16 pages).
(Continued)

*Primary Examiner* — Ted Barnes
(74) *Attorney, Agent, or Firm* — Osha Liang LLP

(57) ABSTRACT

Disclosed is a guidance information display device, including: a display unit; a camera unit; an action detecting unit to detect a specific action of a user; and a control unit to instruct the display unit to display guidance information when the specific action is detected by the action detecting unit and a specific instrument to be operated is shot by the camera unit, the displayed guidance information corresponding to a combination of the detected specific action and the shot instrument to be operated.

28 Claims, 20 Drawing Sheets

(51) Int. Cl.
    *G06F 1/16*            (2006.01)
    *G06F 3/00*            (2006.01)
    *H04N 1/21*            (2006.01)
    *H04N 1/23*            (2006.01)
    *G02B 27/01*          (2006.01)
    *G06F 3/12*            (2006.01)

(52) U.S. Cl.
    CPC ......... *H04N 1/2158* (2013.01); *H04N 1/2323* (2013.01); *H04N 1/2346* (2013.01); *H04N 1/2392* (2013.01); *G02B 2027/014* (2013.01); *G02B 2027/0178* (2013.01); *G02B 2027/0187* (2013.01)

(56) References Cited

U.S. PATENT DOCUMENTS

| | | | | |
|---|---|---|---|---|
| 6,272,431 | B1* | 8/2001 | Zamojdo | G01C 21/36 348/115 |
| 6,369,779 | B1* | 4/2002 | Bartlett | G02B 27/017 345/7 |
| 7,486,175 | B2* | 2/2009 | Suzuki | B60W 50/14 340/435 |
| 7,599,580 | B2* | 10/2009 | King | H04N 1/00244 382/229 |
| 8,345,285 | B2* | 1/2013 | Sugimoto | G03G 15/5091 358/1.13 |
| 8,442,331 | B2* | 5/2013 | King | G06F 17/218 382/229 |
| 8,464,360 | B2* | 6/2013 | Sugimoto | G06F 21/43 726/27 |
| 8,639,433 | B2* | 1/2014 | Meis | G08G 1/096716 701/116 |
| 9,213,405 | B2* | 12/2015 | Perez | H04N 21/25891 |
| 2004/0057743 | A1* | 3/2004 | McIntyre | G03G 15/5016 399/81 |
| 2006/0103591 | A1* | 5/2006 | Tanimura | G06F 1/3218 345/8 |
| 2006/0262352 | A1* | 11/2006 | Hull | G06F 17/30247 358/1.18 |
| 2007/0047002 | A1* | 3/2007 | Hull | G06F 17/30047 358/3.28 |
| 2007/0057426 | A1* | 3/2007 | Tao | G03G 15/6582 270/58.09 |
| 2007/0273610 | A1* | 11/2007 | Baillot | G02B 27/017 345/8 |
| 2009/0073476 | A1* | 3/2009 | Torikoshi | H04N 1/00236 358/1.13 |
| 2009/0157478 | A1* | 6/2009 | Yang | G06Q 30/0201 705/7.29 |
| 2009/0164894 | A1* | 6/2009 | Takekawa | G06F 3/04845 715/274 |
| 2009/0286570 | A1* | 11/2009 | Pierce, Jr. | G06Q 30/06 455/556.1 |
| 2009/0318773 | A1* | 12/2009 | Jung | A61B 5/04009 600/300 |
| 2010/0066559 | A1* | 3/2010 | Judelson | G06T 19/00 340/8.1 |
| 2010/0123928 | A1* | 5/2010 | Morimoto | G06K 9/3208 358/1.15 |
| 2011/0052083 | A1* | 3/2011 | Rekimoto | H04N 1/00244 382/218 |
| 2011/0058187 | A1* | 3/2011 | Smith | G06Q 10/06 358/1.9 |
| 2011/0115816 | A1* | 5/2011 | Brackney | G06Q 10/06 345/629 |
| 2011/0187725 | A1* | 8/2011 | Matsuda | G06F 3/017 345/473 |
| 2011/0234386 | A1* | 9/2011 | Matsuda | G06F 3/017 340/12.54 |
| 2012/0001937 | A1* | 1/2012 | Tagashira | G02B 27/017 345/629 |
| 2012/0019858 | A1* | 1/2012 | Sato | H04N 1/00344 358/1.15 |
| 2012/0026530 | A1* | 2/2012 | Tsongas | H04N 1/00307 358/1.14 |
| 2012/0044535 | A1* | 2/2012 | Samii | B41J 11/009 358/1.15 |
| 2012/0117112 | A1* | 5/2012 | Johnston | G06F 17/3087 707/771 |
| 2012/0140284 | A1* | 6/2012 | Tashiro | B41J 3/46 358/1.15 |
| 2012/0154557 | A1* | 6/2012 | Perez | H04N 21/25891 348/53 |
| 2012/0183137 | A1* | 7/2012 | Laughlin | H04N 7/185 380/200 |
| 2012/0194859 | A1* | 8/2012 | Oda | H04N 1/00323 358/1.15 |
| 2012/0194882 | A1* | 8/2012 | Suzuki | H04N 1/00241 358/505 |
| 2012/0206452 | A1* | 8/2012 | Geisner | G02B 27/017 345/419 |
| 2012/0249588 | A1* | 10/2012 | Tison | G06F 1/1696 345/633 |
| 2012/0313775 | A1* | 12/2012 | Davis | G01C 21/206 340/539.12 |
| 2012/0320216 | A1* | 12/2012 | Mkrtchyan | H04N 5/33 348/164 |
| 2013/0100475 | A1* | 4/2013 | Kuroyanagi | H04N 1/00453 358/1.13 |
| 2013/0114100 | A1* | 5/2013 | Torii | G06F 11/0733 358/1.14 |
| 2013/0117377 | A1* | 5/2013 | Miller | H04L 67/38 709/205 |
| 2013/0194627 | A1* | 8/2013 | Nishiguchi | G06F 3/1293 358/1.15 |
| 2013/0335783 | A1* | 12/2013 | Kurtz | G06K 1/121 358/3.28 |
| 2013/0335784 | A1* | 12/2013 | Kurtz | G06K 1/121 358/3.28 |
| 2014/0009417 | A1* | 1/2014 | Sugimoto | G06F 3/0488 345/173 |
| 2014/0139551 | A1* | 5/2014 | McCulloch | G09G 5/377 345/633 |
| 2014/0139717 | A1* | 5/2014 | Short | H04N 7/142 348/333.1 |
| 2015/0026068 | A1* | 1/2015 | Nuzzi | G06F 21/31 705/44 |

FOREIGN PATENT DOCUMENTS

| | | |
|---|---|---|
| JP | H09-81309 A | 3/1997 |
| JP | 2005-037181 | 2/2005 |
| JP | 2008-201146 A | 9/2008 |
| JP | 2010-211623 A | 9/2010 |
| JP | 2012-008290 A | 1/2012 |
| JP | 2012014406 A | 1/2012 |
| JP | 2012029164 A | 2/2012 |
| JP | 2012096448 A | 5/2012 |
| JP | 2012156872 A | 8/2012 |
| WO | 2007-066166 A1 | 6/2007 |
| WO | 2007-085303 A1 | 8/2007 |
| WO | 2012-060201 A1 | 5/2012 |

OTHER PUBLICATIONS

Patent Abstracts of Japan, Publication No. 2012-008290, Published on Jan. 12, 2012, 1 page.
Patent Abstracts of Japan, Publication No. 2010-211623, Published on Sep. 24, 2010, 1 page.
Patent Abstracts of Japan, Publication No. 2005-037181, Published on Feb. 10, 2005, 1 page.
Patent Abstracts of Japan, Publication No. 2008-201146, Published on Sep. 4, 2008, 1 page.
Patent Abstracts of Japan, Publication No. H09-81309, Published on Mar. 28, 1997, 1 page.

(56) References Cited

OTHER PUBLICATIONS

Office Action issued in corresponding Japanese Application No. 2012-244593 dated Oct. 29, 2014, and English translation thereof (10 pages).
Office Action in corresponding Chinese Patent Application No. 201310535194.0 dated Dec. 3, 2015, with translation (21 pages).
Office Action issued in corresponding European Application No. 13189682.1 dated Jul. 11, 2016 (8 pages).

\* cited by examiner

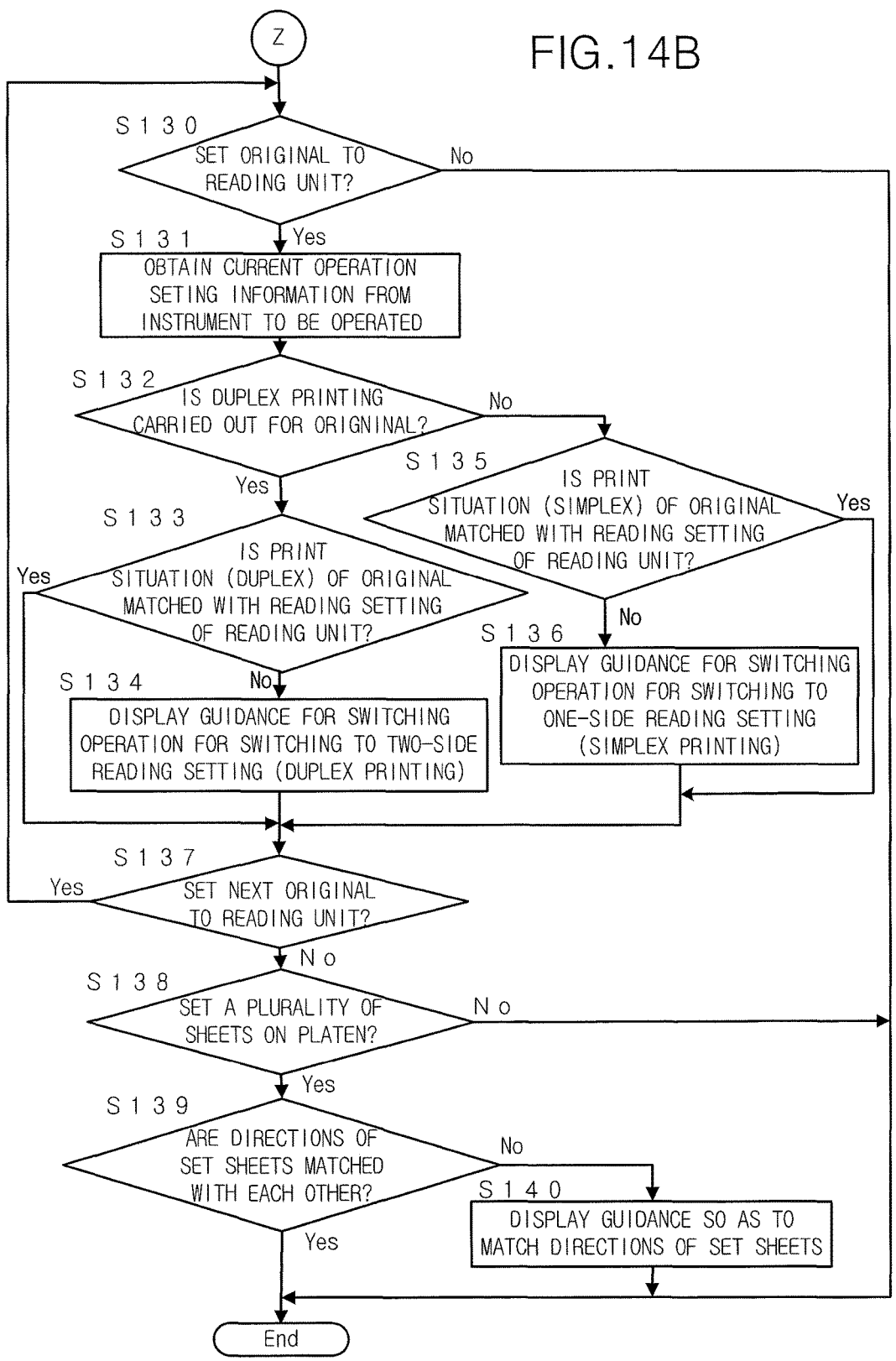

GUIDANCE INFORMATION DISPLAY DEVICE

BACKGROUND OF THE INVENTION

Field of the Invention

The present invention relates to a guidance information display device for displaying guidance information for a user who uses an instrument.

Description of Related Art

Various types of display devices for specifying an object which is watched by a user, in accordance with an image obtained by a camera provided in a head-mounted display, and for displaying information relating to the specified object in real time, have been proposed.

For example, in Japanese Patent Application Publication No. 2012-008290, an eyeglass type of display device is disclosed. In the display device, in order to specify an object which is watched by a user more precisely even though the posture of user's head is changed, the object is specified in accordance with the detected posture of user's head, the detected eye direction and image information of the eyesight synchronization camera and the related information is displayed.

In Japanese Patent Application Publication No. 2010-211623, a task support system for supporting an assembly task of a device is disclosed. In the task support system, the parts to be used in the next task are specified from a manual and the image of the parts is displayed in a head-mounted display. Then, the parts which are picked up by a worker are detected and a warning is displayed in case that the detected parts are not suitable.

In Japanese Patent Application Publication No. 2005-37181, an eyeglass type of display device comprising a GPS receiver (position detecting unit) for detecting user's position and an eyesight detecting sensor (recognizing unit) for recognizing an object in user's eye direction, is disclosed. In the display device, the additional information relating to the position detected by the GPS receiver (position detecting unit) and the object recognized by the eyesight detecting sensor (recognizing unit) is transmitted to the user.

The related information to be displayed by a conventional eyeglass type of display device is the information relating to the specified object which is watched by a user.

However, in case that the object is used in any instrument or device, when the related information is displayed only by watching the object, there is some possibility that the suitable information cannot be displayed.

For example, the guidance information or the like to be displayed when the object which is watched by a user is used in a predetermined instrument, becomes necessary when the object is actually used in the instrument. Even though the information is displayed when the user watches the object, there are some cases that the guidance information is not displayed at a suitable timing and is not effective.

Further, in case that there are a plurality of types of instruments in which the object watched by a user can be used, it is not possible to determine the information to be provided to a user, only by specifying the object. Further, even in the identical instrument, there are some cases that the suitable information to be provided to the user is changed according to the state of the instrument.

In addition to the case in which the information is displayed in accordance with the object watched by a user, also in the case in which any action from which user's intention can be estimated is detected and the information relating to user's intention is provided, the above-described problem is caused.

SUMMARY

To achieve at least one of the abovementioned objects, a guidance information display device reflecting one aspect of the present invention, comprises:

a display unit;

a camera unit;

an action detecting unit to detect a specific action of a user; and a control unit to instruct the display unit to display guidance information when the specific action is detected by the action detecting unit and a specific instrument to be operated is shot by the camera unit, the displayed guidance information corresponding to a combination of the detected specific action and the shot instrument to be operated.

Preferably, the control unit instructs the display unit to display the guidance information corresponding to the combination of the detected specific action and the shot instrument to be operated, in accordance with a state of the instrument to be operated or a portion of the instrument to be operated, which is shot by the camera unit.

Preferably, the action detecting unit detects the specific action in accordance with an image obtained by the camera unit.

Preferably, the specific action is a specific input operation carried out for an operating unit of the instrument to be operated.

Preferably, the specific action is a specific gesture of the user.

Preferably, the action detecting unit comprises a sound detecting unit to detect specific sound information as the specific action.

Preferably, the guidance information display device further comprises a communication unit, wherein the control unit obtains information relating to the state of the instrument to be operated, by using the communication unit.

Preferably, the control unit recognizes the state of the instrument to be operated, in accordance with an image of the instrument to be operated, which is obtained by the camera unit.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 14A and 14B are a flowchart showing the subsequent process of FIG. 13B;

DETAILED DESCRIPTION OF PREFERRED EMBODIMENT

Hereinafter, a preferred embodiment of the present invention will be explained with reference to the accompanying drawings.

Figure 1:
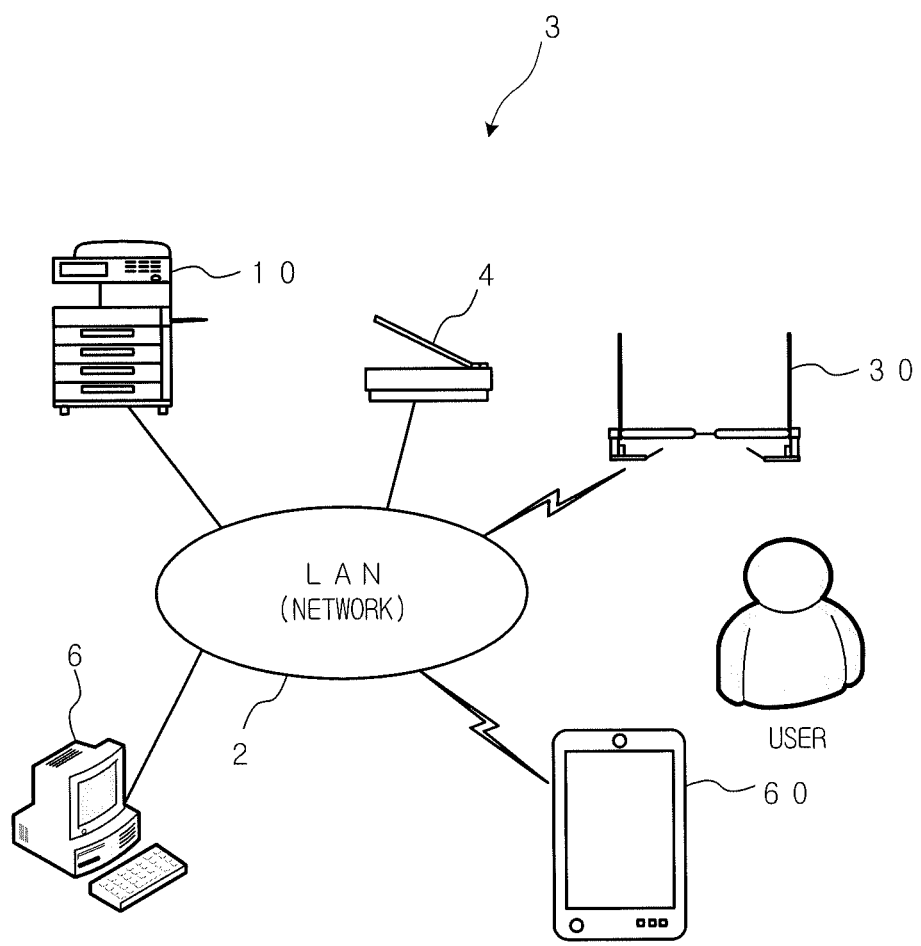
FIG. 1 is a view showing the information system in which the guidance information display devices according to the embodiment are used.

FIG. 1 shows the information system 3 in which the guidance information display devices according to the embodiment are used. In the information system 3, instruments to be operated, such as an image processing apparatus 10, an image reading device 4, a PC (Personal Computer) 6 and the like, a head-mounted display (HMD) device 30 as the guidance information display device for providing the guidance information relating to the usage and the operation of the above instruments to a user, a portable terminal 60 as the guidance information display device are connected via a network 2, such as a LAN (Local Area Network) or the like. As the LAN, not only a wired network but also a wireless network can be adopted. The types and the number of the instruments to be operated and the types and the number of the guidance information display devices are not limited to those of FIG. 1. As the guidance information display device, one of the head-mounted display device 30 and the portable terminal 60 may be used.

The image processing apparatus 10 is a so-called multifunction peripheral (MFP) having a copy function of printing an image on recording paper by optically reading an image of an original, a scan function of obtaining image data by reading an image of an original to store the image data as a file or to transmit the image data to an external terminal via the network 2, a printer function of printing out an image on the recording paper by forming the image relating to the print data received from the PC 6 or the like via the network 2, a facsimile function of transmitting and receiving the image data in accordance with the facsimile process, and the like. The image processing apparatus 10 has the function as the image forming apparatus having the function of printing image on the recording paper.

The image reading device 4 is a device for obtaining image data by optically reading an image of an original to output the obtained image data (so-called a scanner). The PC 6 is a personal computer which is operated in accordance with various types of application programs. Each of the image processing apparatus 10, the image reading device 4 and the PC 6 has a connection I/F (Interface) unit for connecting an external memory, such as a USB (Universal Serial Bus) memory or the like.

The head-mounted display device 30 and the portable terminal 60 are wirelessly connected to the network 2. Each of the head-mounted display device 30 and the portable terminal 60 comprises a display unit, a camera unit and an action detecting unit for detecting a specific action of a user. Further, when the specific action indicating a user's intention is detected by the action detecting unit and a specific instrument to be operated is shot by the camera unit, each CPU (control unit) of the head-mounted display device 30 and the portable terminal 60 instructs the display unit to display the guidance information corresponding to the combination of the detected specific action and the shot instrument to be operated.

The camera unit of the head-mounted display device 30 shoots in user's eye direction. In the portable terminal 60, the user shoots the instrument to be operated, by using the camera unit 66 of the portable terminal 60 when the user wants to obtain the guidance information of the instrument to be operated. The specific action to be detected is a predetermined user's action (specific gesture) which includes picking up an original or a bundle of blank sheets, watching (gazing at) an original or a bundle of blank sheets, picking up a detachable external memory, such as a USB memory, watching a detachable external memory, such as a USB memory, and the like. For example, the action of watching a USB memory is taken in case that the user cannot use any of his/her hands (for example, the user picks up another object or operates another device (for example, PDA or the like), even though the user intends to carry out any operation by using the USB memory.

For example, in the head-mounted display device 30, when the action detecting unit 54 detects user's action of picking up an original in accordance with the image obtained by the camera unit and the image reading device 4 is shot by the camera unit, the CPU 41 judges that the user intends to read the original by using the image reading device 4 and instructs the display unit of the head-mounted display device 30 to display the guidance information for reading the original by using the image reading device 4.

Figure 2:
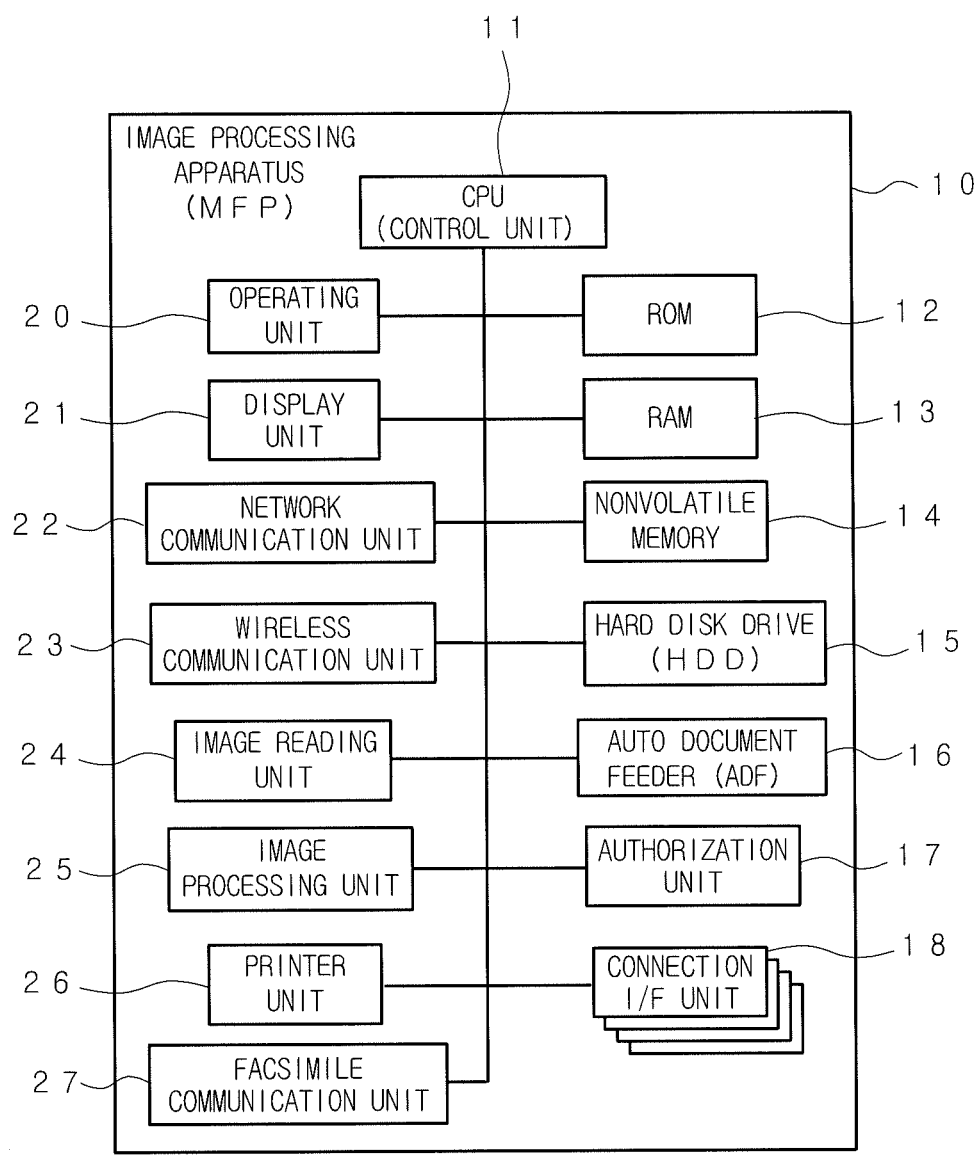
FIG. 2 is a block diagram showing the schematic configuration of the image processing apparatus which is one of the instruments to be operated.

FIG. 2 is a block diagram showing the schematic configuration of the image processing apparatus 10. The image processing apparatus 10 comprises a CPU (Central Processing Unit) 11 for controlling the entire operation of the image processing apparatus 10. The CPU 11 is connected with a ROM (Read Only Memory) 12, a RAM (Random Access Memory) 13, a nonvolatile memory 14, a hard disk drive 15, an auto document feeder (ADF) 16, an authorization unit 17, a plurality of connection I/F units 18, an operating unit 20, a display unit 21, a network communication unit 22, a wireless communication unit 23, an image reading unit 24, an image processing unit 25, a printer unit 26, a facsimile communication unit 27 and the like.

By the CPU 11, a middleware, application programs and the like are executed on an OS (Operating System) program as a base. In the ROM 12, various types of programs are stored. By carrying out various types of processes by the CPU 11 in accordance with these programs, each function of the image processing apparatus 10 is realized.

The RAM 13 is used as a work memory for temporarily storing various data when the CPU 11 carries out the process in accordance with the programs, and an image memory for storing image data.

The nonvolatile memory 14 is a memory (flash memory) in which the stored contents are not damaged even if the image processing apparatus 10 is turned off. The nonvolatile memory 14 is used for storing various types of setting information, and the like. The hard disk drive 15 is a large-capacity nonvolatile storing device. In the hard disk drive 15, print data, image data, various types of programs and data are stored.

The image reading unit 24 has a function of obtaining image data by optically reading an image of an original. For example, the image reading unit 24 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The auto document feeder 16 has a function of feeding an original set to the document feed tray from the top page sheet by sheet, passing the original through the reading position of the image reading unit 24 and discharging the original to the predetermined discharge position. Further, the auto document feeder 16 has a function of automatically inverting the original. Therefore, it is possible to automatically read both surfaces of the original.

The image reading unit 24 has a function of reading the original disposed on a platen glass and a function of sequentially reading the original fed by the auto document feeder 16. The image reading unit 24 can read the original having A3 size (297 mm×420 mm) at the maximum. In case that the image reading unit 24 reads the original by disposing the original on the platen glass, it is possible to read two A4 size (210 mm×297 mm) sheets of the original, which are arranged side by side at once.

The authorization unit 17 authorizes the user who uses the image processing apparatus 10. The method for authorizing the user may be optional, such as password, fingerprint, vein authentication, or the like.

The connection I/F unit 18 is a connection port for detachably connecting an external memory. In the image processing apparatus 10, a plurality of connection I/F units 18 are provided. The type of external memory to be connected includes a USB memory, CF (Compact Flash®), an SD (Secure Digital) memory card, and the like.

The operating unit 20 and the display unit 21 constitute an operation panel for receiving an operation, such as input of a job from the user. The display unit 21 is formed by a liquid crystal display (LCD) and the like, and has a function of displaying various types of operation windows and setting windows, and the like. The operating unit 20 comprises various types of operation switches, such as a start button and the like, and a touch panel provided on the physical screen of the display unit 21. The touch panel detects a coordinate position on which the contact operation is carried out for the physical screen of the display unit 21 by using a touch pen, user's finger or the like.

The network communication unit 22 has a function of communicating with the PC 6, an external device, such as another server and the like via the network 2, such as LAN. Further, the network communication unit 22 has a function of the wireless LAN.

The wireless communication unit 23 has a function of the wireless communication with the head-mounted display device 30 and the portable terminal 60. The sufficient communicable distance of the wireless communication unit 23 is about several meters. As the communication method, various types of near field communications can be adopted. The wireless communication with the head-mounted display device 30 or the portable terminal 60 may be carried out by the wireless LAN using the network communication unit 22.

The image processing unit 25 carries out the rasterizing process for converting print data into image data, the compression/decompression process for the image data, and the like in addition to the processing, such as the enlargement/reduction or the rotation of image data.

The printer unit 26 has a function of forming an image on the recording paper in accordance with the image data. In this embodiment, the printer unit 26 is configured as so-called laser printer comprising a conveying device for the recording paper, a photoconductive drum, a charging device, a laser unit, a developing device, a transfer and separation device, a cleaning device and a fixing device. The laser printer carries out the image forming by the electrophotographic process. The image forming may be carried out by another process. The printer unit 26 comprises a plurality of feed trays and a manual feed tray, and prints an image by conveying the recording paper from the selected feed tray or the manual feed tray. The printer unit 26 has a duplex printing function.

The facsimile communication unit 27 has a function of transmitting and receiving the image data to/from an external device having the facsimile function via the telephone line.

Figure 3:
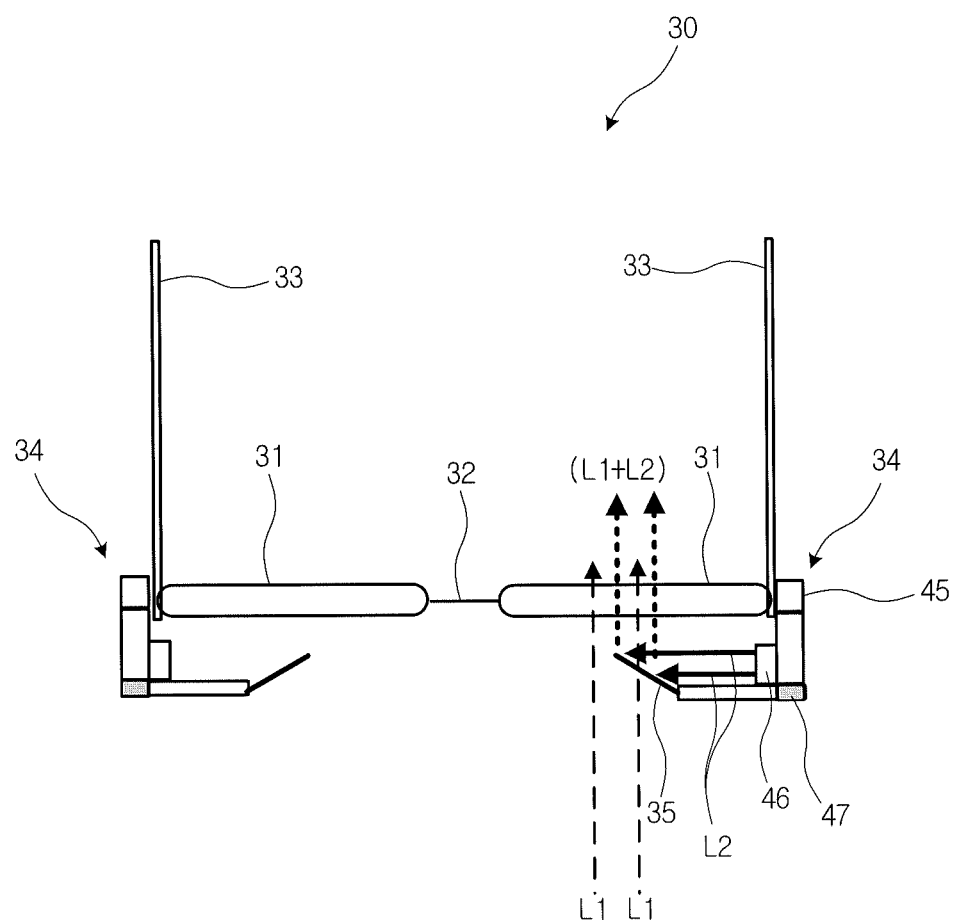
FIG. 3 is a view showing the schematic configuration (external appearance) of the head-mounted display device as the guidance information display device according to the embodiment.

FIG. 3 shows the schematic configuration of the head-mounted display device 30. The head-mounted display device 30 has a form which is similar to that of an eye glasses, and is used by mounting it on a human's head. In the head-mounted display device 30 of this embodiment, the system in which an image is overlapped with the outside scene by using half mirrors (so-called, the light transmission type), is adopted.

The head-mounted display device 30 comprises display units 31 which are arranged in front of the user's right and left eyes, respectively when the user wears the head-mounted display device 30, a bridge 32 for connecting between the right and left display units 31, temples 33 which extend in the same direction from each end portion of the right and left display units 31 connected by the bridge 32 and which are put on the user's ears, and the like.

On each end portion of the display units 31, a main unit 34 including a control circuit, a projecting unit 46, a camera 47 and the like, is provided. Further, a half mirror 35 is supported by a support member extending from each of the main units 34 so as to be arranged in front of each display unit 31.

The half mirror 35 is provided so as to slant at the angle of 45 degree with respect to the light L1 which is incident from the front of the head-mounted display device 30 to the display unit 31. The projecting unit 46 of the main unit 34 projects the image (which is the image light L2 for forming the augmented reality information) to the half mirror 35. The half mirror 35 is formed by coating a reflective film (a metal film and a dielectric film) on a transparent substrate (glass substrate). In the half mirror 35, the ratio of the amount of the transmitted light to the amount of the reflected light is 1:1.

The light obtained by synthesizing the outside light L1 and the image light L2 at the ratio of 1:1 is incident to eyes of the user who wears the head-mounted display device 30 via the display units 31. That is, the user who wears the head-mounted display device 30 watches the situation which is obtained by overlapping the outside scene with the image projected by the projecting unit 46 at the transmittance of 50%.

Figure 4:
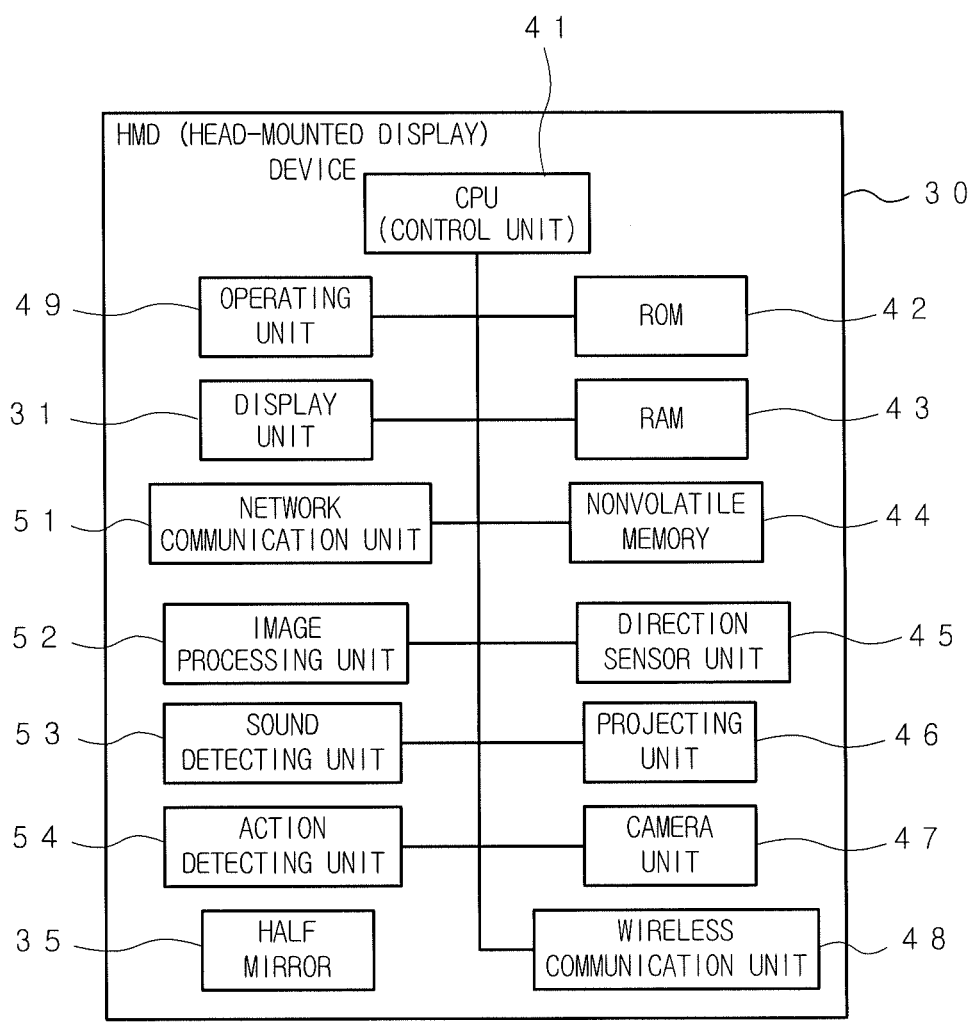
FIG. 4 is a block diagram showing the configuration of the head-mounted display device.

FIG. 4 is the block diagram showing the configuration of the head-mounted display device 30. The head-mounted display device 30 comprises a CPU 41 which functions as a control unit, a ROM 42, a RAM 43, a nonvolatile memory 44, a direction sensor unit 45, the projecting unit 46, the camera unit 47, a wireless communication unit 48, an operating unit 49, the display unit 31, a network communication unit 51 an image processing unit 52, a sound detecting unit 53, an action detecting unit 54 and the like, which are connected with the CPU 41 via a bus.

The CPU 41 controls the operation of the head-mounted display device 30 in accordance with programs stored in the ROM 42. In the ROM 42, the programs, fixed data and the like are stored. The RAM 43 is used as a work memory for temporarily storing various data when the CPU 41 executes the programs. In the nonvolatile memory 44, various types of setting information are stored.

The direction sensor unit 45 detects the direction and the posture of the head-mounted display device 30 and the change in the direction and the posture. The direction sensor unit 45 comprises a plurality of geomagnetic sensors and a plurality of acceleration sensors so as to combine them. The direction sensor unit 45 detects the posture of the user who wears the head-mounted display device 30, the direction in which the user faces and the angle at which the user faces (the direction and the angle which are detected by the direction sensor unit 45 are coincident with the shooting direction and the shooting angle of the camera unit 47). Further, in case that the head-mounted display device 30 is moved, for example, in case that the head-mounted display device 30 is inclined, the direction sensor unit 45 detects the direction and the speed of the motion of the head-mounted display device 30. Then, the direction sensor unit 45 transmits the detection result to the CPU 41. In accordance with the detection result transmitted from the direction sensor unit 45, the CPU 41 recognizes the posture of the user who wears the head-mounted display device 30, the angle of the head-mounted display device 30, and the direction and the speed of the motion of the head-mounted display device 30, which is caused by inclining the head-mounted display device 30.

The projecting unit 46 projects the image (which is the image light L2 for forming the augmented reality information), toward the half mirror 35 as described above.

The camera unit 47 carries out the shooting in the front direction of the head-mounted display device 30. In detail, the camera unit 47 carries out the shooting in the range which is substantially the same as the user's field of view in case that the user looks forward. The camera unit 47 may be provided on each of the right and left main units 34, or on one of the right and left main units 34. The camera unit 47 takes the movie, for example, the camera unit 47 takes the images at 30 frames per second.

The operating unit 49 comprises switches and the like which are provided in the main units 34 and the like, and is used for adjusting the brightness of the projected image and the like.

The network communication unit 51 has a function of communicating with the instrument to be operated, such as the image processing apparatus 10, and another external device via the network 2 including the wireless LAN. The wireless communication unit 48 has a function of carrying out the near field communication with the nearby instrument to be operated (image processing apparatus 10 or the like).

The image processing unit 52 carries out the enlargement/reduction, the deformation or the like of the image which is projected from the projecting unit 46 to the display unit 31 via the half mirror 35.

The sound detecting unit 53 detects user's voice or the like. The action detecting unit 54 detects the specific action by judging whether the user who wears the head-mounted display device 30 takes the predetermined specific action in accordance with the image obtained by the camera unit 47 and/or the sound detected by the sound detecting unit 53. The CPU 41 may have the above function of the action detecting unit 54.

Figure 5:
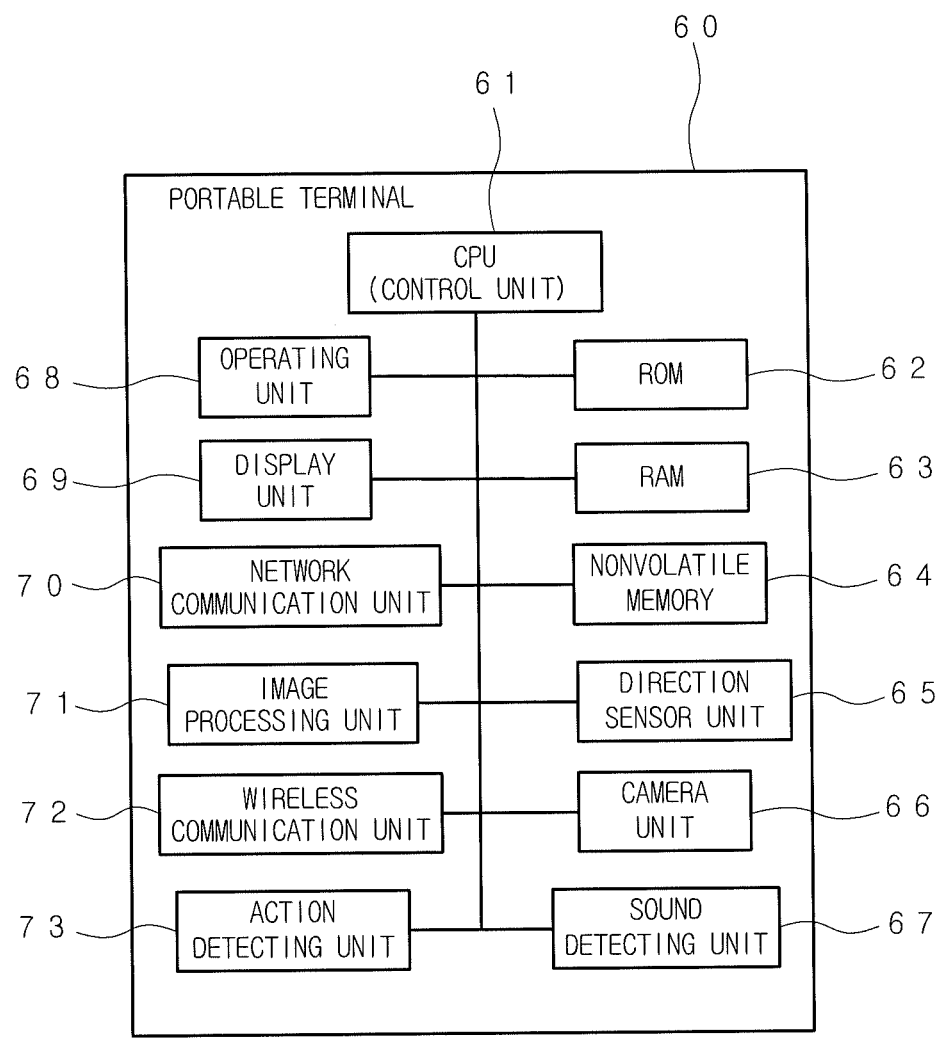
FIG. 5 is a block diagram showing the schematic configuration of the portable terminal as the guidance information display device according to the embodiment.

FIG. 5 shows the schematic configuration of the portable terminal 60. In the portable terminal 60, a CPU 61 is connected with a ROM 62, a RAM 63, a nonvolatile memory 64, a direction sensor unit 65, a camera unit 66, a sound detecting unit 67, an operating unit 68, a display unit 69, a network communication unit 70, an image processing unit 71, a wireless communication unit 72, an action detecting unit 73 and the like via a bus.

The CPU 61 controls the operation of the portable terminal 60 in accordance with programs stored in the ROM 62. In the ROM 62, the programs, fixed data and the like are stored. The RAM 63 is used as a work memory for temporarily storing various data when the CPU 61 executes the programs, and the like. In the nonvolatile memory 64, various types of setting information are stored.

The direction sensor unit 65 detects the direction and the posture of the portable terminal 60 and the change in the direction and the posture. The direction sensor unit 65 has the same configuration as the direction sensor unit 45 of the head-mounted display device 30. The camera unit 66 is provided on the rear surface of the portable terminal 60, and carries out the shooting in the direction in which the rear surface of the portable terminal 60 faces. The camera unit 66 can take the movie, for example, the camera unit 66 takes the images at 30 frames per second.

The display unit 69 is formed by a liquid crystal display and the like. The operating unit 68 is formed by a touch panel provided on the physical screen of the display unit 69, and the like.

The network communication unit 70 has a function of communicating with the instrument to be operated, such as the image processing apparatus 10, and another external device via the network 2 including the wireless LAN. The wireless communication unit 72 has a function of carrying out the near field communication with the nearby instrument to be operated (image processing apparatus 10 or the like).

The image processing unit 71 carries out various types of processings for the image data, such as the rotation, the enlargement/reduction, the deformation of the image data and the like.

The sound detecting unit 67 detects the voice of the user who has the portable terminal 60, or the like. The action detecting unit 73 detects the specific action by judging whether the user takes the specific action in accordance with the image obtained by the camera unit 66 and/or the sound detected by the sound detecting unit 67. The CPU 61 may have the above function of the action detecting unit 73.

Next, various types of examples of the guidance information which is displayed by the head-mounted display device 30 which is one of the guidance information display devices, will be explained.

Figure 6A:
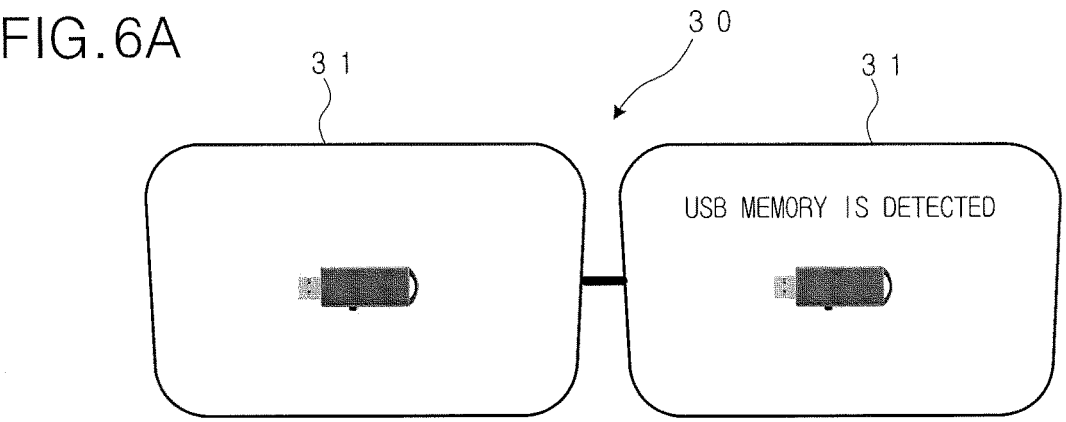
FIGS. 6A to 6C are views showing examples of the guidance information displayed in case that after a user who wears the head-mounted display device picks up and watches a USB memory, the user watches the image processing apparatus.
Figure 6B:
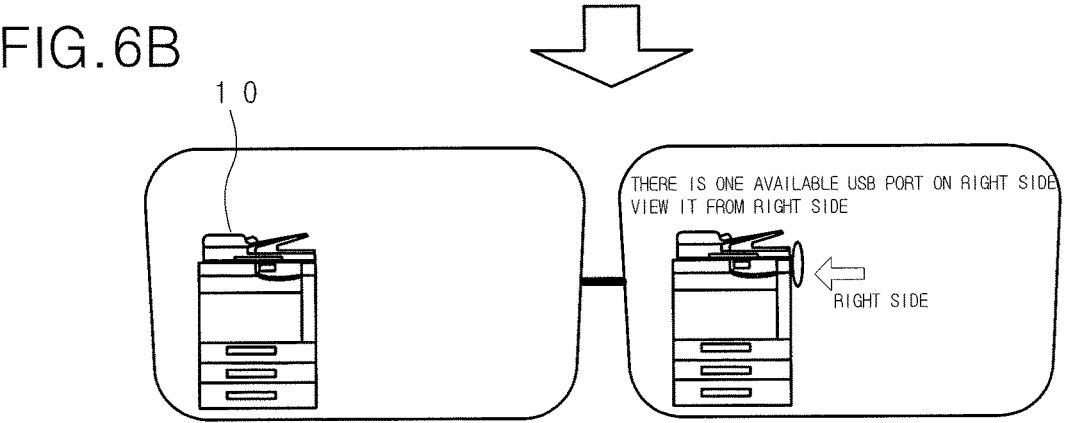
Figure 6C:
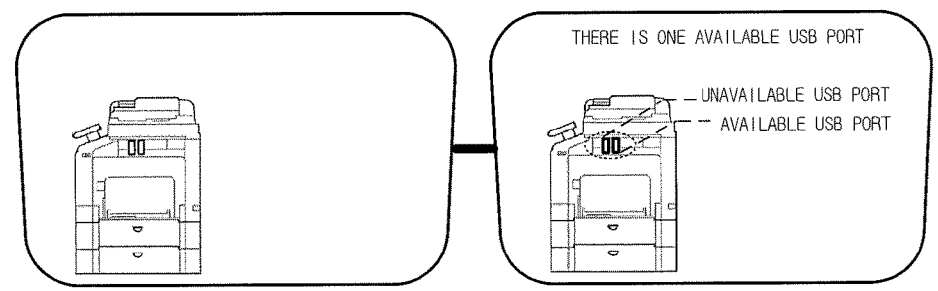

FIGS. 6A to 6C show examples of the guidance information displayed in case that after the user who wears the head-mounted display device 30 picks up and watches a USB memory, the user watches the image processing apparatus 10 (the image processing apparatus 10 is shot by the camera unit 47). In FIG. 6A to FIG. 11B, the actual image which is watched by the user is shown in the left display unit 31, and the synthetic image obtained by overlapping the actual image with the image (guidance information) projected from the projecting unit 46 by using the half mirror 35, is shown in the right display unit 31.

When the user watches the USB memory (FIG. 6A), the action detecting unit 54 of the head-mounted display device 30 analyzes the image obtained by the camera unit 47, and detects the user's specific action "the user picks up and watches the USB memory". Then, the CPU 41 which is the control unit instructs the display unit 31 to display the guidance information "USB memory is detected" by overlapping the guidance information with the actual image (real image). In this stage, the user's intention that the user wants to use the USB memory is recognized.

Subsequently, as shown in FIG. 6B, when the user watches the image processing apparatus 10 which is the instrument to be operated, the head-mounted display device 30 detects the fact in which the user watches the image processing apparatus 10 in accordance with the image obtained by the camera unit 47. Then, the CPU 41 recognizes the user's intention that the user carries out a certain operation for the shot image processing apparatus 10 by using the USB memory, from the combination of the specific action in which the user picks up and watches the USB memory and the shot image processing apparatus 10, and instructs the display unit 31 to display the guidance information corresponding to the above combination.

In this case, the CPU 41 obtains the information indicating the state of the image processing apparatus 10 which is connected with the USB memory, via the communication with the image processing apparatus 10 by using the wireless communication unit 48 or the network communication unit 51 as the communication unit. Then, the CPU 41 instructs the display unit 31 to display the obtained information and the guidance information in accordance with the portion of the image processing apparatus, which is watched by the user and the position of the above portion. Specifically, the CPU 41 obtains the information of the position in which the connection I/F units 18 are provided and the information relating to the position of the connection I/F unit 18 for the USB memory and the usage status (occupied/unoccupied) of the above connection I/F unit 18, via the communication with the image processing apparatus 10.

As shown in FIG. 6B, in case that the portion of the image processing apparatus 10, which is watched by the user (which is shot by the camera unit 47), is the front of the image processing apparatus 10, it can be estimated that the user will search the connection I/F units 18. Therefore, in the head-mounted display device 30, the CPU 41 instructs the display unit 31 to display the guidance information indicating that the connection I/F unit 18 is provided on the right side of the main body of the image processing apparatus 10, by overlapping the guidance information with the actual image of the image forming apparatus 10. In detail, the CPU 41 analyzes the image, specifies the position and the direction of the image processing apparatus 10 in the actual image displayed by the display unit 31 and adjusts the display position and the display size of the guidance information so as to overlap the guidance information with the actual image at the suitable position, to instruct the display unit 31 to synthesize (overlap) and display the guidance information with the actual image.

Then, as shown in FIG. 6C, when the user watches the right side of the image processing apparatus 10 from the right of the image processing apparatus 10 (when the right side of the image processing apparatus 10 is shot by the camera unit 47), it can be estimated that the user will search the connection I/F unit 18 to be connected to the USB memory. Therefore, in the head-mounted display device 30, the CPU 41 instructs the display unit 31 to display the guidance information indicating the connection port (connection I/F unit 18) which can be connected to the USB memory among a plurality of provided connection I/F units 18, by overlapping the guidance information with the actual image. In the example shown in FIG. 6C, the display unit 31 displays the message indicating that there is one available USB port and the message indicating whether the USB memory can be connected to each connection port, by overlapping the above message with the actual image of each connection port.

Figure 7A:
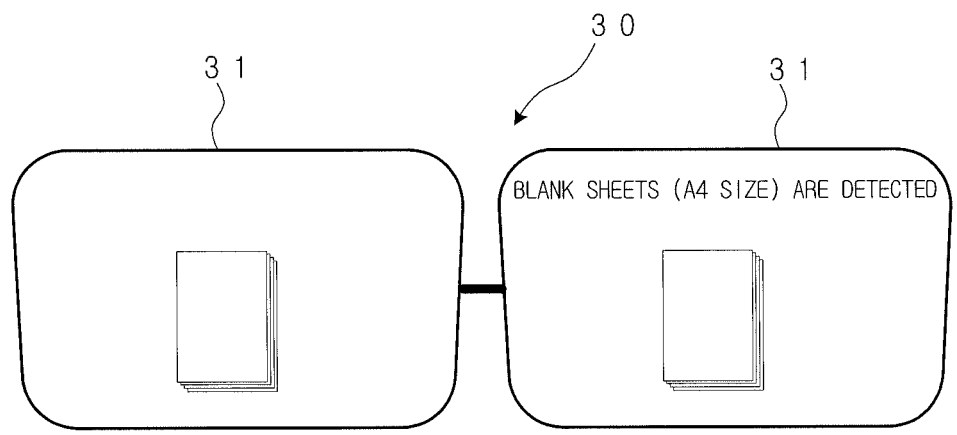
FIGS. 7A and 7B are views showing examples of the guidance information displayed in case that after a user who wears the head-mounted display device picks up and watches a bundle of blank sheets, the user watches the image processing apparatus.
Figure 7B:
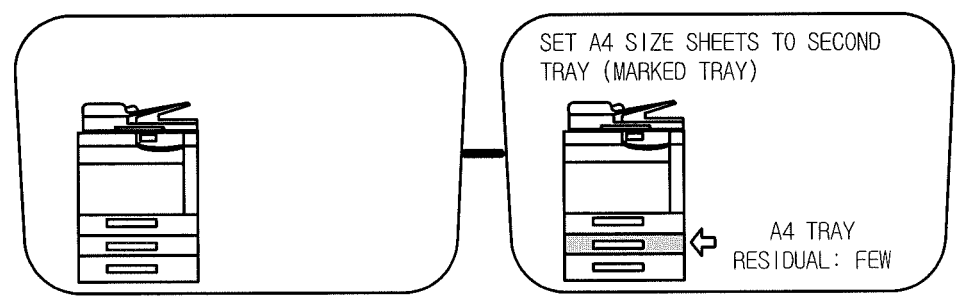

FIGS. 7A and 7B show the examples of the guidance information displayed in case that after the user who wears the head-mounted display device 30 picks up and watches a bundle of blank sheets, the user watches the image processing apparatus 10.

When the user watches a bundle of blank sheets (FIG. 7A), the action detecting unit 54 of the head-mounted display device 30 analyzes the image obtained by the camera unit 47, detects the user's specific action "the user picks up a bundle of blank sheets" and detects the size of the blank sheet. Then, the CPU 41 which is the control unit instructs the display unit 31 to display the guidance information "Blank sheets (A4 size) are detected" by overlapping the guidance information with the actual image. In this stage, the user's intention that the user wants to use a bundle of blank sheets for a certain purpose is recognized.

Subsequently, as shown in FIG. 7B, when the user watches the image processing apparatus 10 which is the instrument to be operated, the head-mounted display device 30 detects the fact in which the user watches the image processing apparatus 10 in accordance with the image obtained by the camera unit 47. Then, the CPU 41 of the head-mounted display device 30 recognizes the user's intention that the user sets a bundle of blank sheets to the feed tray of the image processing apparatus 10, from the combination of the specific action in which the user watches a bundle of blank sheets and the shot image processing apparatus 10 (instrument having a function of printing an image on a sheet), and instructs the display unit 31 to display the guidance information corresponding to the above combination.

In this case, the CPU 41 obtains the information relating to the position of each feed tray, the information relating to the size of sheet to be contained in each feed tray and the remaining sheets contained in each feed tray, and the like via the communication with the image processing apparatus 10 by using the wireless communication unit 48 or the network communication unit 51 as the communication unit. Then, the CPU 41 of the head-mounted display device 30 instructs the display unit 31 to display the guidance information indicating the position of the feed tray matched with the size (A4 size) of blank sheets which are picked up by the user, and indicating the remaining sheets contained in the above feed tray, and the like, by overlapping the guidance information with the actual image.

Figure 8A:
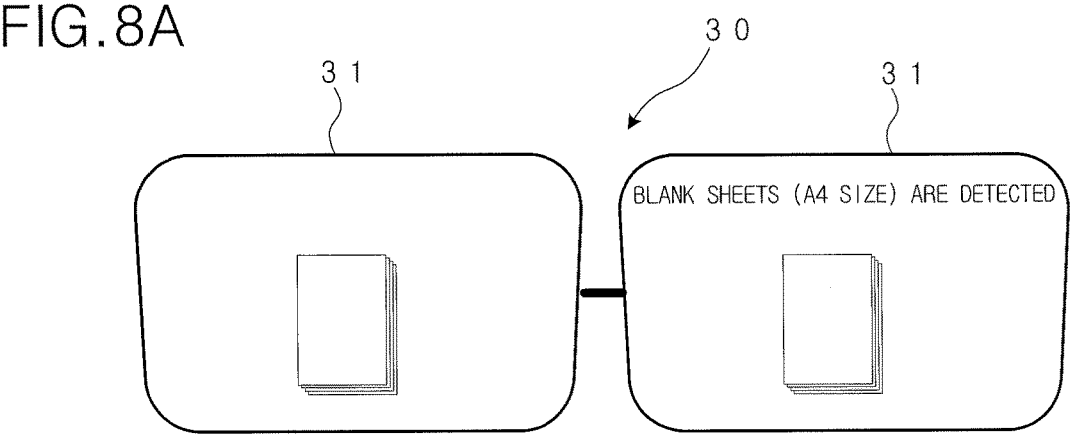
FIGS. 8A to 8C are views showing examples of the guidance information displayed in case that after a user who wears the head-mounted display device picks up and watches a bundle of A4 size blank sheets, the user watches the image processing apparatus and A4 size blank sheets are set to a manual feed tray.
Figure 8B:
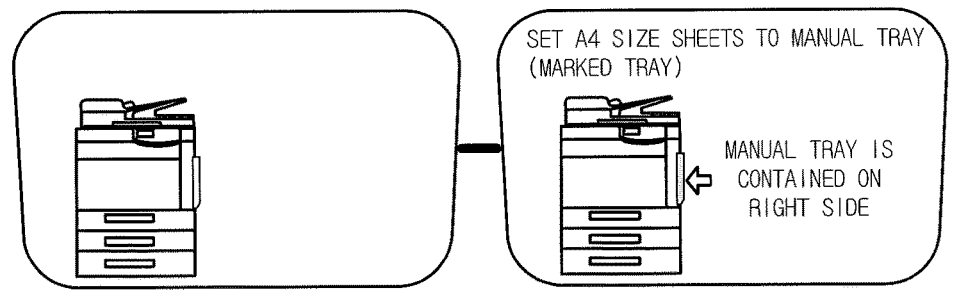
Figure 8C:
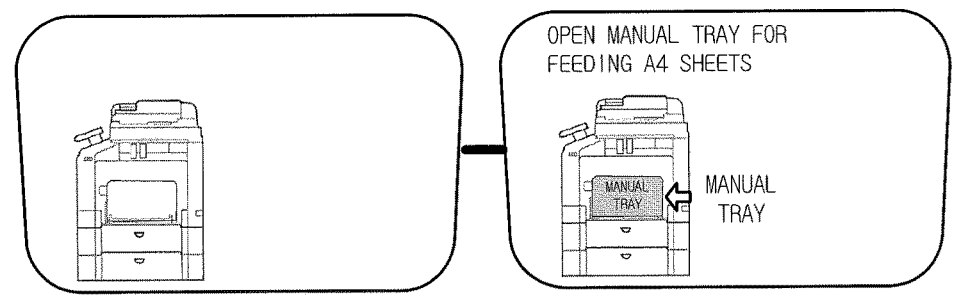

FIGS. 8A to 8C show the examples of the guidance information displayed in case that after the user who wears the head-mounted display device 30 picks up and watches a bundle of A4 size blank sheets, the user watches the image processing apparatus 10 and A4 size blank sheets are set to a manual feed tray.

When the user watches a bundle of blank sheets (FIG. 8A), the action detecting unit 54 of the head-mounted display device 30 analyzes the image obtained by the camera unit 47, detects the user's specific action "the user picks up a bundle of blank sheets" and detects the size of the blank sheets. Then, the CPU 41 which is the control unit instructs the display unit 31 to display the guidance information "Blank sheets (A4 size) are detected" by overlapping the guidance information with the actual image. In this stage, the user's intention that the user wants to use a bundle of blank sheets for a certain purpose is recognized.

Subsequently, as shown in FIG. 8B, when the user watches the image processing apparatus 10 which is the instrument to be operated, the head-mounted display device 30 detects the fact in which the user watches the image processing apparatus 10 in accordance with the image obtained by the camera unit 47. Then, the CPU 41 of the head-mounted display device 30 recognizes the user's intention that the user sets a bundle of blank sheets to the feed tray of the image processing apparatus 10, from the combination of the specific action in which the user watches a bundle of blank sheets and the shot image processing apparatus 10, and instructs the display unit 31 to display the guidance information corresponding to the above combination.

In this case, the CPU 41 obtains the information relating to each position of the feed trays and the manual feed tray, the information relating to the size of sheet to be contained in each feed tray and the remaining sheets contained in each feed tray, and the like via the communication with the image processing apparatus 10 by using the wireless communication unit 48 or the network communication unit 51 as the communication unit. Further, the CPU 41 obtains the information indicating that the sheets having the sizes except A4 size are set to each feed tray, from the image processing apparatus 10. In this case, the CPU 41 of the head-mounted display device 30 judges that a bundle of blank sheets having A4 size, which are picked up by the user are required to be set to the manual feed tray. However, as shown in FIG. 8B, because the portion of the image processing apparatus 10, which is watched by the user (which is shot by the camera unit 47) is the front of the image processing apparatus 10, the CPU 41 judges that it is required to guide the user to the position of the manual feed tray. Then, the CPU 41 instructs the display unit 31 to display the guidance information for prompting the user to set the blank sheets having A4 size to the manual tray and the guidance information indicating the position of the manual feed tray, by overlapping the guidance information with the actual image.

Then, as shown in FIG. 8C, when the user watches the right side of the image processing apparatus 10 from the right of the image processing apparatus 10 (when the right side of the image processing apparatus 10 is shot by the camera unit 47), the CPU 41 of the head-mounted display device 30 instructs the display unit 31 to display the massage for prompting the user to open the manual feed tray and the guidance information indicating the position of the manual feed tray in the actual image (the right side of the image processing apparatus 10), by overlapping the above message and the guidance information with the actual image.

Figure 9A:
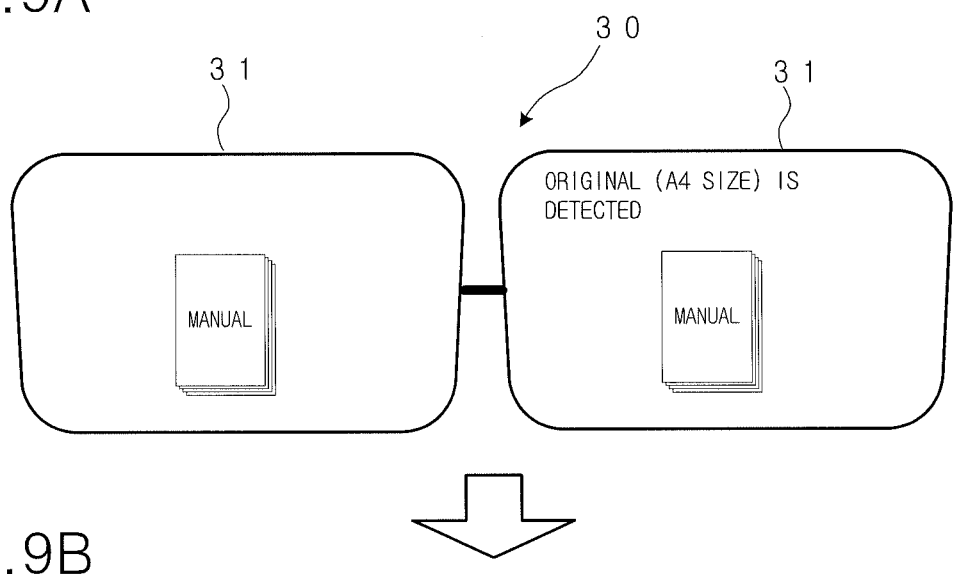
FIGS. 9A and 9B are views showing examples of the guidance information displayed in case that after a user who wears the head-mounted display device picks up and watches a printed original, the user watches the operation panel of the image processing apparatus.
Figure 9B:
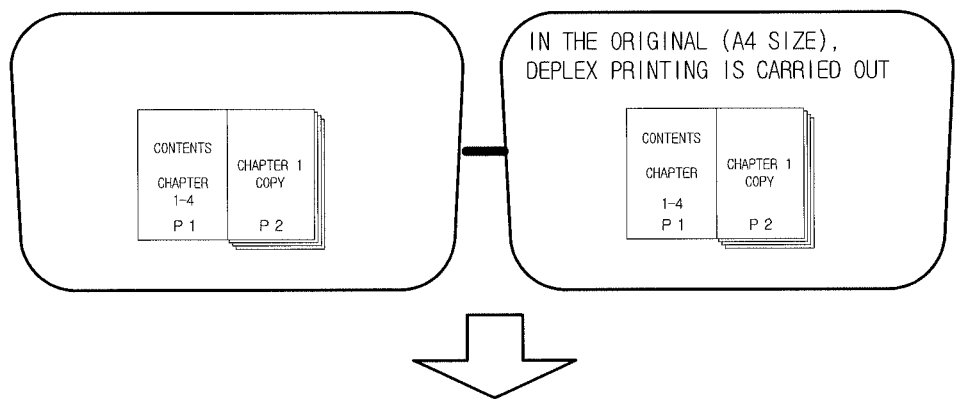
Figure 10:
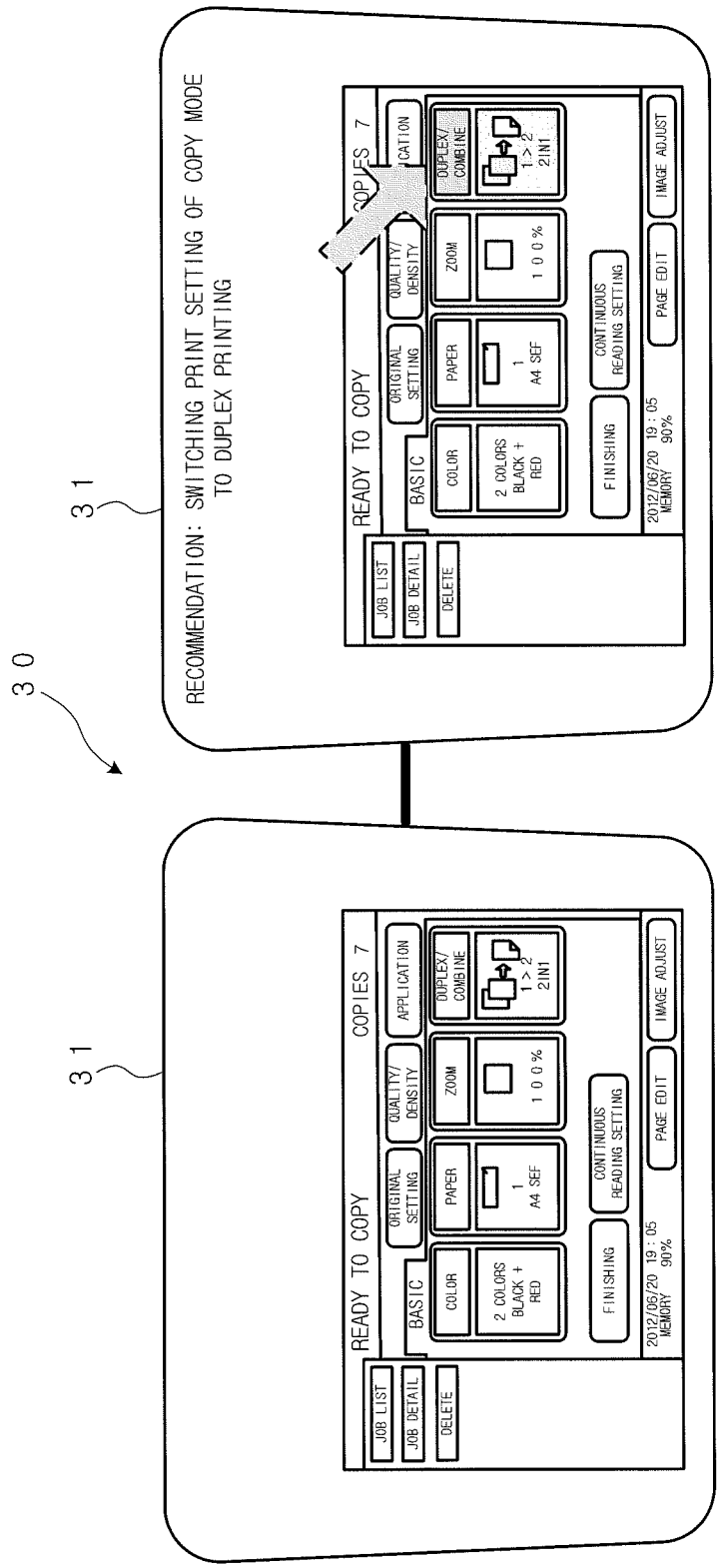
FIG. 10 is a view showing an example of the guidance information displayed in case that after a user who wears the head-mounted display device picks up and watches a printed original, the user watches the operation panel of the image processing apparatus.

FIGS. 9A and 9B and FIG. 10 show the examples of the guidance information displayed in case that after the user who wears the head-mounted display device 30 picks up and watches a printed original, the user watches the operation panel of the image processing apparatus 10. When the user watches a printed original (FIG. 9A), the action detecting unit 54 of the head-mounted display device 30 analyzes the image obtained by the camera unit 47, detects the user's specific action "the user picks up and watches an original" and detects the size of the original. Then, the CPU 41 which is the control unit instructs the display unit 31 to display the guidance information "Original (A4 size) is detected" by overlapping the guidance information with the actual image.

Subsequently, as shown in FIG. 9B, when the CPU 41 confirms that in the original which is picked up by the user, the printing is carried out also for the rear surfaces from the image obtained by the camera unit 47, the CPU 41 instructs the display unit 31 to display the guidance information "In the original, duplex printing is carried out" by overlapping the guidance information with the actual image.

Then, when the user watches the operation panel of the image processing apparatus 10 which is the instrument to be operated, the head-mounted display device 30 detects the fact in which the user watches the copy setting window in the operation panel of the image processing apparatus 10 in accordance with the image obtained by the camera unit 47. Then, as shown in FIG. 10, the CPU 41 instructs the display unit 31 to display the guidance information for recommending that the user changes the printing setting in the copy mode to the duplex printing, as the guidance information corresponding to the combination of the specific action "the user picks up the original for which the duplex printing is carried out" and the shot image processing apparatus 10 and the shot portion of the image processing apparatus 10 (the copy setting window in the operation panel), by overlapping the guidance information with the actual image. In this case, the position of the operation button for switching the printing setting to the duplex printing, is also displayed.

In the copy setting, there are a one-side/two-side reading setting for reading the original and a simplex/duplex printing setting for carrying out the printing for the sheet. In the guidance information, it may be recommended to switch the above both settings to the two-side reading setting and the duplex printing setting, respectively. Alternatively, it may be recommended to switch at least the one-side/two-side reading setting to the two-side reading setting. Further, in case that the shot portion of the image processing apparatus 10 is the setting window relating to the scan mode (for example, Scan to HDD (Scan to Box)) or the like, which is displayed in the operation panel, the guidance information indicating that the one-side/two-side reading setting for reading the original is switched to the two-side reading setting is displayed or the one-side/two-side reading setting is automatically set to the two-side reading setting.

Figure 11A:
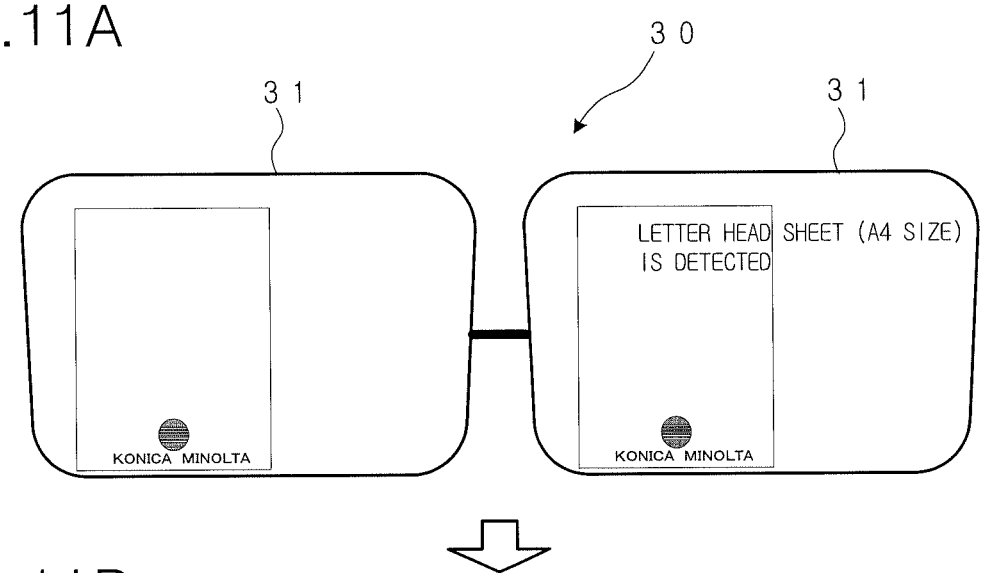
FIGS. 11A and 11B are views showing examples of the guidance information displayed in case that after a user who wears the head-mounted display device picks up and watches a letter head sheet, the user watches the feed tray of the image processing apparatus.
Figure 11B:
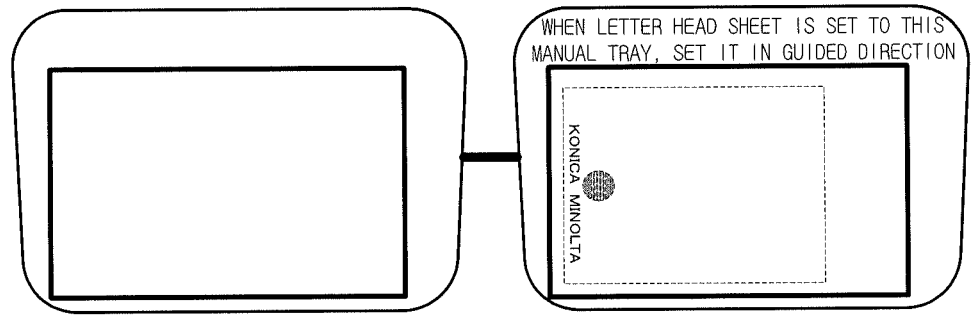

FIGS. 11A and 11B show the examples of the guidance information displayed in case that after the user who wears the head-mounted display device 30 picks up and watches a letter head sheet, the user watches the feed tray of the image processing apparatus 10. When the user picks up and watches a letter head sheet (FIG. 11A), the action detecting unit 54 of the head-mounted display device 30 analyzes the image obtained by the camera unit 47, detects the user's specific action "the user picks up and watches a letter head sheet" and detects the size of the letter head sheet. Then, the CPU 41 which is the control unit instructs the display unit 31 to display the guidance information "Letter head sheet (A4 size) is detected" by overlapping the guidance information with the actual image.

Subsequently, as shown in FIG. 11B, when the user opens the feed tray of the image processing apparatus 10 which is the instrument to be operated, the head-mounted display device 30 detects the fact in which the user opens the feed tray of the image processing apparatus 10 in accordance with the image obtained by the camera unit 47. Then, the CPU 41 of the head-mounted display device 30 recognizes the user's intention that the user intends to set the letter head sheet to the opened feed tray, from the combination of the specific action in which the user picks up the letter head sheet and the shot image processing apparatus 10 and the shot portion of the image processing apparatus 10 (feed tray), and instructs the display unit 31 to display the guidance information corresponding to the above combination.

In this case, the CPU 41 judges the correct direction in which the letter head sheet is set to the feed tray in accordance with the position and the direction of the letter head which is printed on the sheet, and instructs the display unit 31 to display the guidance information indicating the correct direction (the correct setting of the letter head sheet to the feed tray) by overlapping the guidance information with the actual image. In FIG. 11B, the image of the letter head sheet which is directed to the correct direction is displayed by overlapping the image with the actual image of the feed tray. In the embodiment, the letter head is the image and/or the character as the printed information, such as a logo. The letter head sheet is the sheet on which the letter head is printed.

In addition, the information system 3 operates as follows.

For example, in case that the action detecting unit 54 detects the specific action in which the user picks up and watches the printed sheet (original) after an external memory is attached, or in case that the action detecting unit 54 detects that the user sets the original to the image reading unit 24 (ADF or platen glass) after an external memory is attached, the CPU 41 instructs the display unit 31 to display the guidance information relating to the scan to external memory function.

Further, in case that it is detected that the user does not pick up the original (sheet) and the fact in which the original (sheet) has not been set to the image reading unit 24 (ADF or platen glass) is detected, the CPU 41 may instruct the display unit 31 to display the guidance information relating to the function using the external memory (print mode: direct print) in the current processing mode (print mode/transmission mode/box mode or the like).

In case that the detected specific action is the action in which the user intends to arrange two sheets of the original in order on the platen glass of the reading device (the image processing apparatus 10 or the image reading device 4) having the function of optically reading the original and the instrument to be operated, which is shot by the camera unit 47 is the reading device for reading the original, the CPU 41 instructs the display unit 31 to display the method for setting the second sheet of the original so as to match the direction of the second sheet with the direction of the first sheet of the original according to the direction of the first sheet which is shot by the camera unit 47 when the above specific action is detected, as the guidance information.

For example, when the user picks up the first sheet of the original, the CPU 41 judges the direction of the original (from the contents of the original) in accordance with the image obtained by the camera unit 47. Then, the CPU 41 stores the direction of the first sheet in the RAM 43 or the like when the first sheet is set on the platen glass by turning over the first sheet. Next, when the user picks up the second sheet of the original in the state that the platen cover is open, the CPU 41 judges the direction of the second sheet. Then, when the second sheet is set on the platen glass by turning over the second sheet, the CPU 41 judges whether the direction of the second sheet is matched with the direction of the first sheet. In case that the direction of the second sheet is not matched with the direction of the first sheet, the CPU 41 instructs the display unit 31 to display the guidance information indicating that the direction of the original is inversed and indicating the advice for reversing the direction of the original and for setting the original again, by overlapping the guidance information with the actual image.

Further, in case that the combination of the detected specific action and the instrument to be operated, which is shot by the camera unit 47 is the combination of the specific action in which the user picks up (or watches) a stapler or a clip and the image processing apparatus 10 having the function of printing an image on the sheets, the CPU 41 obtains the information relating to the function of the binding the sheets via the communication with the image processing apparatus 10 by using the wireless communication unit 48 or the network communication unit 51 as the communication unit, and judges whether the sheets can be bound by the image processing apparatus 10. When the CPU 41 judges that the sheet can be bound by the image processing apparatus 10, the CPU 41 instructs the display unit 31 to display the guidance information relating to the function of binding the sheets in the image processing apparatus 10.

For example, when the user watches the front of the image processing apparatus 10 after the user picks up the stapler, the CPU 41 instructs the display unit 31 to display the guidance information indicating that the image processing apparatus 10 has the function of binding the sheets by the staple. Then, when the user watches the operation panel of the image processing apparatus 10, the CPU 41 instructs the display unit 31 to display the guidance information for setting the binding function.

Further, in case that the combination of the specific action and the instrument to be operated, which is shot by the camera unit 47 is the combination of the specific action in which the user picks up (or watches) the punch machine and the image processing apparatus 10 having the function of printing an image on the sheet, the CPU 41 obtains the information relating to the punching function via the communication with the image processing apparatus 10 by using the wireless communication unit 48 or the network communication unit 51 as the communication unit. Then, the CPU 41 judges whether the sheet can be punched by the image processing apparatus 10. When the CPU 41 judges that the sheet can be punched by the image processing apparatus 10, the CPU 41 instructs the display unit 31 to display the guidance information relating to the punching function of the image processing apparatus 10.

For example, when the user watches the front of the image processing apparatus 10 after the user picks up the punch machine, the CPU 41 instructs the display unit 31 to display the guidance information indicating that the image processing apparatus 10 has the punching function. Then, when the user watches the operation panel of the image processing apparatus 10, the CPU 41 instructs the display unit 31 to display the guidance information for setting the punching function.

The specific action may include a key input to the instrument to be operated. Alternatively, the specific action may include the user utterance of the specific sound information (message), which is detected by the sound detecting unit 53.

As an example of the key input which is the specific action, for example, instead of the specific action in which the user picks up a USB memory, the input of the selection operation for selecting the function using an external memory, such as a USB memory, via the operation panel is detected as the specific action. Then, when the CPU 41 recognizes that the instrument to be operated is the image processing apparatus 10 in accordance with the image obtained by the camera unit 47, the CPU 41 obtains the information relating to the position of the connection I/F units 18 for the external memory and the information relating to the occupied/unoccupied status of each connection I/F unit 18, from the image processing apparatus 10. The CPU 41 instructs the display unit 31 to display the guidance information as shown in FIGS. 6B and 6C.

For example, the function using the external memory includes "scan to external memory function" for storing the image data file obtained by reading an original in the external memory, "direct print function" for printing a file stored in the external memory, and the like.

Further, when the action detecting unit 54 detects the user's input of the selection operation for selecting the function using a telephone line, for example, the G3 facsimile transmission function, from the operation panel as the specific action, and the CPU 41 recognizes that the instrument to be operated is the image processing apparatus 10 having the facsimile transmission function in accordance with the image obtained by the camera unit 47, the CPU 41 obtains the information relating to the connection status of the telephone line, the usage status of the current telephone line and the like from the image processing apparatus 10. The CPU 41 instructs the display unit 31 to display the guidance information relating to the facsimile transmission according to the current state of the image processing apparatus 10. For example, in case that the telephone line is not connected to the connection I/F unit 18 for the telephone line, the warning for indicating "no connection" is displayed.

Further, when the action detecting unit 54 detects the user's input of the selection operation for selecting the function using a network communication, for example, the Internet facsimile transmission function, from the operation panel as the specific action, and the CPU 41 recognizes that the instrument to be operated is the image processing apparatus 10 having the Internet facsimile transmission function in accordance with the image obtained by the camera unit 47, the CPU 41 obtains the information indicating whether the network line is connected to the connection I/F unit 18, and the like, from the image processing apparatus 10. The CPU 41 instructs the display unit 31 to display the guidance information relating to the Internet facsimile transmission according to the current state of the image processing apparatus 10. For example, in case that the Internet line is not connected to the connection I/F unit 18, the warning for indicating "no connection" is displayed.

By detecting the specific sound information, the user's intention may be recognized and the guidance information may be displayed like the above key input operation. For example, like the input of the above selection operation for selecting the function button, the head-mounted display device 30 may operate by inputting the sound information indicating "select the G3 facsimile transmission".

In the head-mounted display device 30, the guidance information is displayed by overlapping the guidance information with the actual image. In case that the guidance information display device is the portable terminal 60, the guidance information is displayed by overlapping the guidance information with the image obtained by the camera unit 66. For example, the CPU 61 which is the control unit adjusts the display position and the display size of the guidance information so as to overlap the guidance information with the image (real image) of the instrument to be operated, which is obtained by the camera unit 66 and is displayed by the display unit 69, and instructs the display unit 69 to display the guidance information.

Next, the operation of the head-mounted display device 30 which is the guidance information display device will be explained in accordance with the flowcharts. The operation of the portable terminal 60 which is the guidance information display device is the same as that of the head-mounted display device 30.

Figure 12:
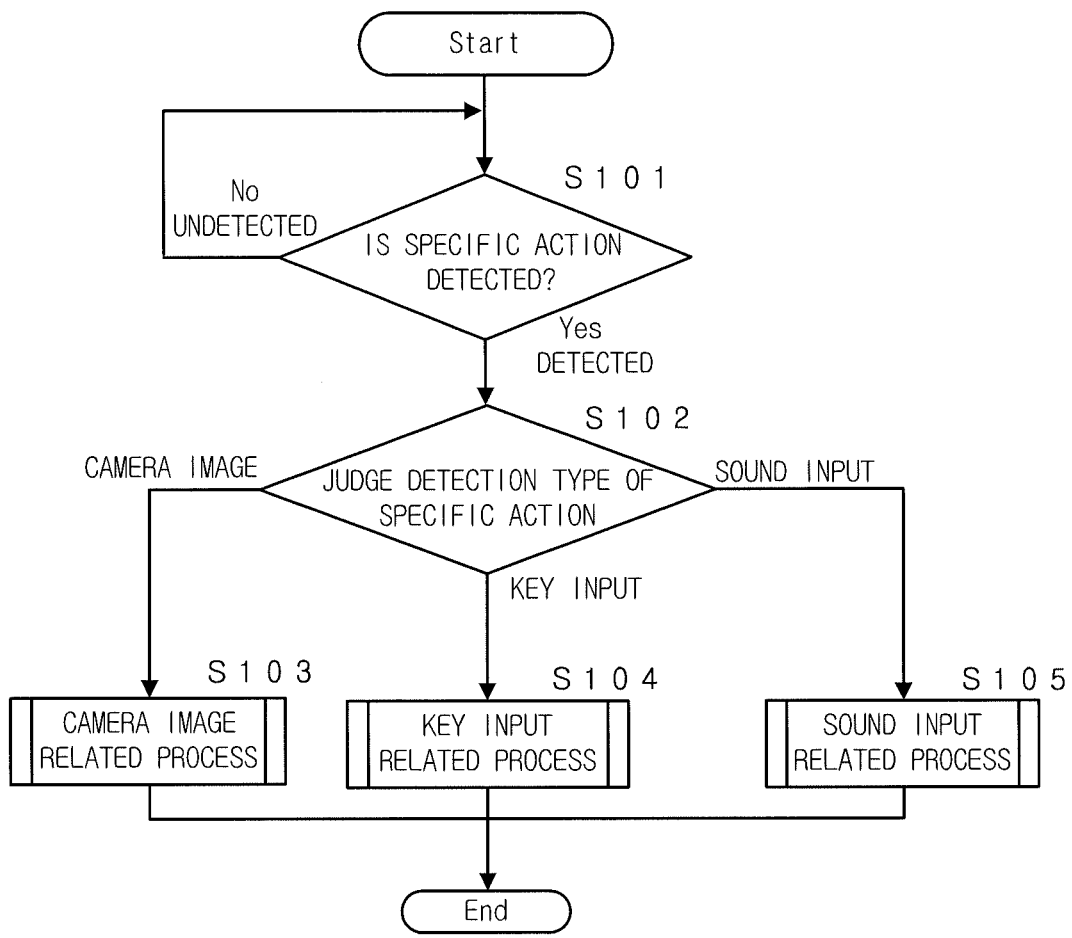
FIG. 12 is a flowchart showing the whole process which is carried out by the head-mounted display device.
Figure 13A:
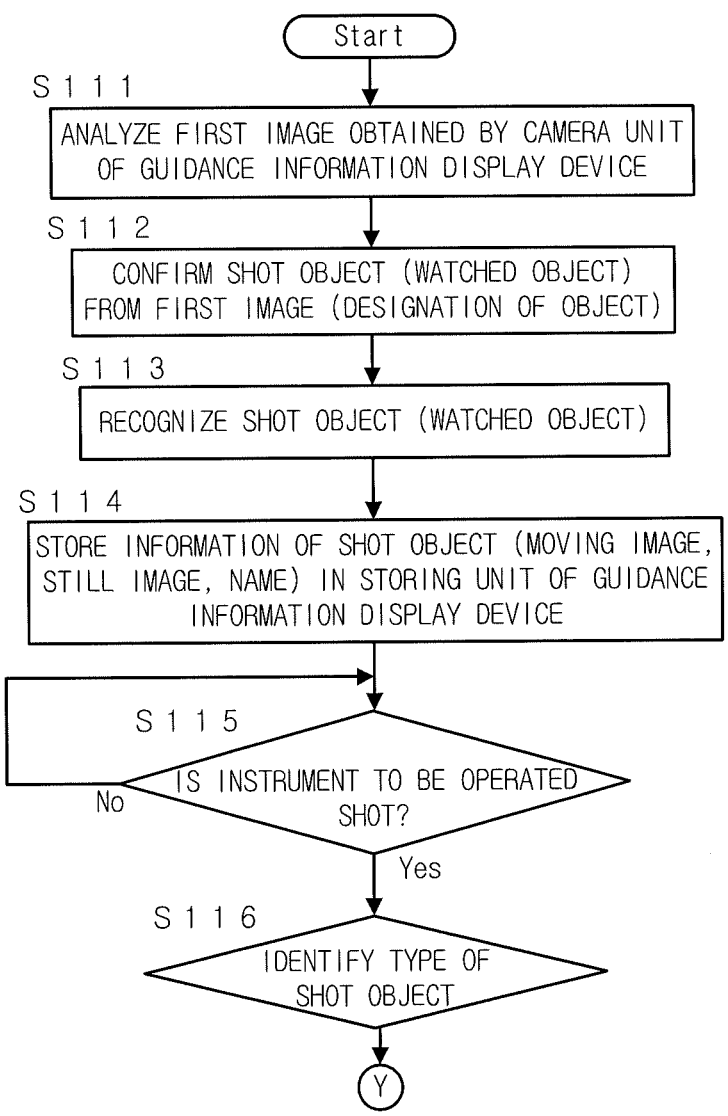
FIGS. 13A and 13B are a flowchart showing the detail of the camera image related process (Step S103 in FIG. 12)
Figure 13B:
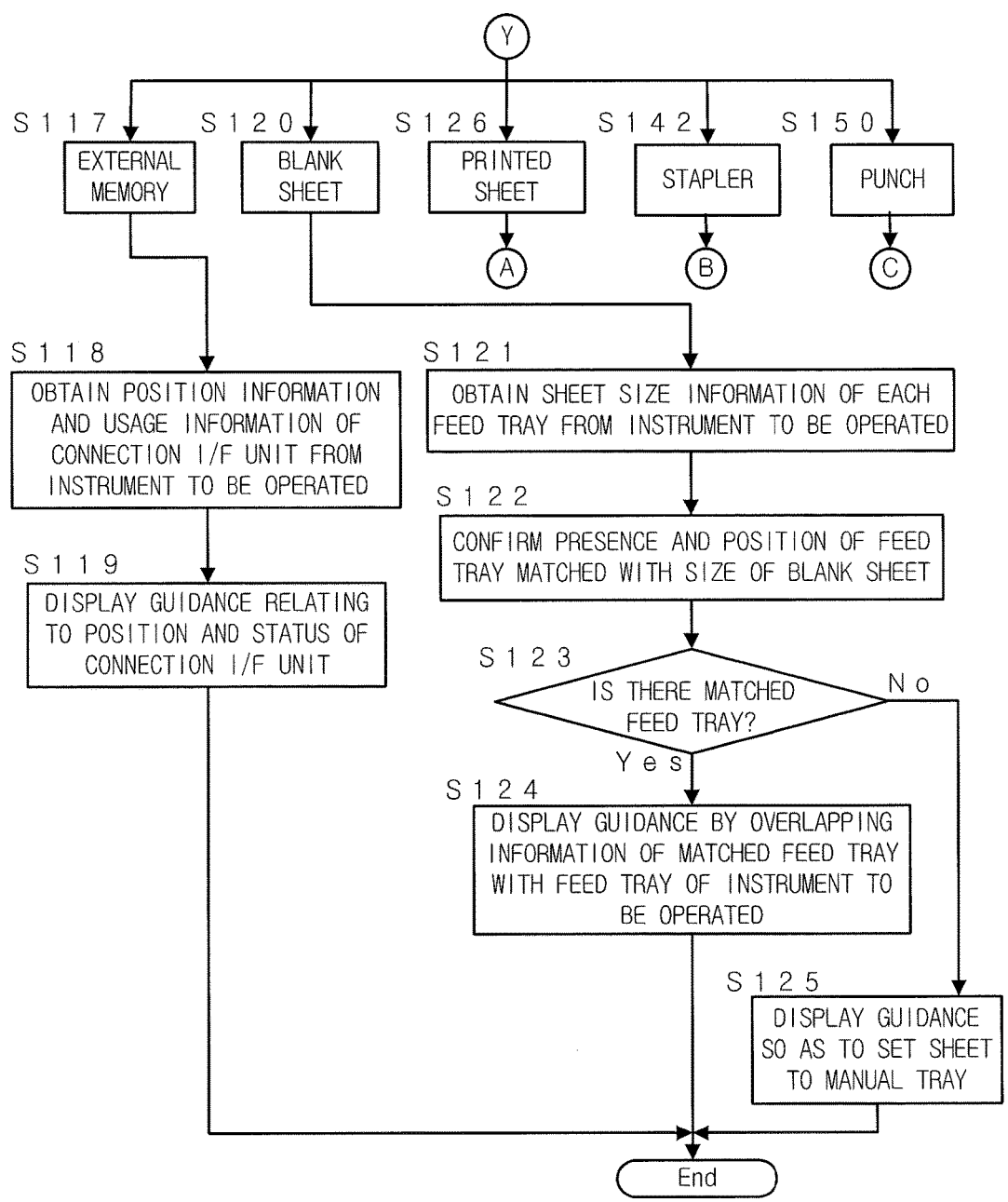
Figure 14A:
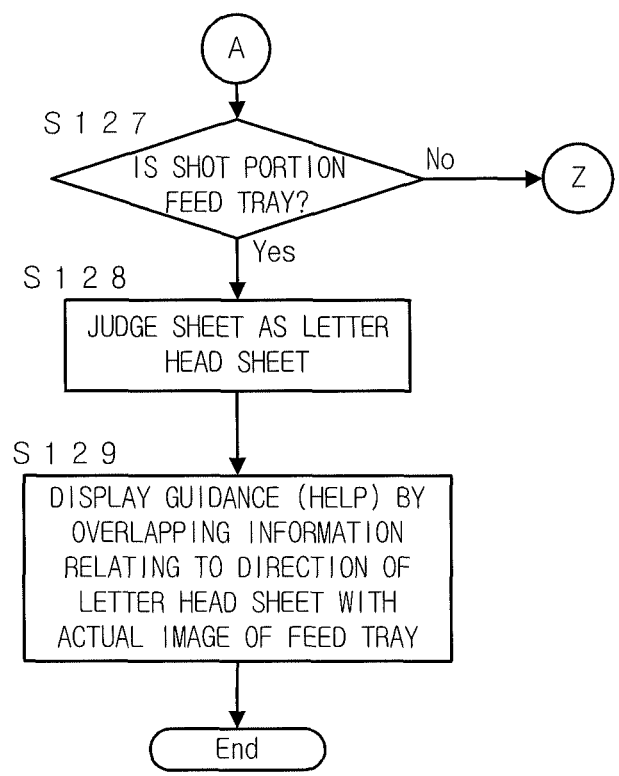

FIG. 12 is the flowchart showing the whole process which is carried out by the head-mounted display device 30. The CPU 41 of the head-mounted display device 30 monitors whether the action detecting unit 54 detects the predetermined specific action (Step S101; No). When the specific action is detected (Step S101; Yes), the action detecting unit 54 judges the detection type of the specific action (Step S102). In case that the detected specific action is the specific action specified from the camera image (Step S102; camera image), the CPU 41 carries out the camera image related process for displaying the guidance information by analyzing the user's intention from the camera image (Step S103). The image used for the detection of the specific action is referred to as the first image.

In case that the detected specific action is the specific action specified from the key input (Step S102; key input), the CPU 41 carries out the key input related process for displaying the guidance information by analyzing the user's intention from the key input (Step S104). In case that the detected specific action is the specific action specified from the sound information (Step S102; sound input), the CPU 41 carries out the sound input related process for displaying the guidance information by analyzing the user's intention from the input sound information (Step S105).

FIGS. 13A and 13B, FIGS. 14A and 14B, and FIG. 15 are the flowchart showing the detail of the camera image related process (Step S103 in FIG. 12). The CPU 41 of the head-mounted display device 30 analyzes the first image obtained by the camera unit 47 (Step S111). The CPU 41 confirms the shot object (the watched object) (Step S112) and recognizes what the shot object is (Step S113). For example, the CPU 41 recognizes the object watched by the user, such as a USB memory, a blank sheet or the like, as the shot object. Then, the CPU 41 stores the information relating to the shot object (moving image, still image, name or the like) in the RAM 43 or the like (Step S114).

Next, when the instrument to be operated is shot by the camera unit 47 (Step S115; Yes), the CPU 41 identifies the type of the shot object (Step S116). In case that the shot object (the object which the user picks up and watches or the object which the user does not pick up but watches, for example, by moving the user's face close to the object) is an external memory (Step S117), the CPU 41 instructs the display unit 31 to display the guidance information corresponding to the combination of the external memory and the instrument to be operated, which is shot in Step S115. That is, the CPU 41 specifies the shot instrument to be operated and obtains the information relating to the position of the connection I/F unit in the instrument to be operated and the occupied/unoccupied status of the connection I/F unit via the communication with the instrument to be operated (Step S118). Then, the CPU 41 instructs the display unit 31 to display the guidance information relating to the position of the connection I/F unit for the external memory and the occupied/unoccupied status of the connection I/F unit (Step S119), and this process is ended.

In case that the shot object (the object which the user picks up and watches or the object which the user does not pick up but watches, for example, by moving the user's face close to the object) is a bundle of blank sheets (Step S120), the CPU 41 instructs the display unit 31 to display the guidance information corresponding to the combination of the blank sheets and the instrument to be operated, which is shot in Step S115.

That is, the CPU 41 specifies the shot instrument to be operated and obtains the information relating to the position of each feed ray and the size of the sheets to be contained in each feed tray, from the instrument to be operated, via the communication with the instrument to be operated (Step S121). Then, the CPU 41 confirms the presence and the position of the feed tray which is matched with the size of the blank sheets (Step S122). In case that the feed tray in which the size of the sheets to be contained is matched with the size of the blank sheets is provided (Step S123; Yes), the CPU 41 instructs the display unit 31 to display the guidance information indicating the feed tray by overlapping the guidance information with the actual image of the shot instrument to be operated (Step S124). Then, this process is ended.

In case that the feed tray in which the size of the sheets to be contained is matched with the size of the blank sheets is not provided (Step S123; No), the CPU 41 instructs the display unit 31 to display the guidance information for recommending that the user sets the sheets to the manual feed tray and the guidance information relating to the position of the manual feed tray, by overlapping the above guidance information with the actual image of the shot instrument to be operated (Step S125). Then, this process is ended.

In case that the shot object (the object which the user picks up and watches or the object which the user does not pick up but watches, for example, by moving the user's face close to the object) is a printed sheet (Step S126), the CPU 41 instructs the display unit 31 to display the guidance information corresponding to the combination of the printed sheet and the instrument to be operated, which is shot in Step S115. In detail, the CPU 41 judges whether the shot portion of the instrument to be operated is the feed tray or not (Step S127 in FIG. 14A). In case that the shot portion is the feed tray (Step S127; Yes), the CPU 41 judges that the printed sheet is a letter head sheet (Step S128). The CPU 41 instructs the display unit 31 to display the guidance information relating to the correct set direction of the letter head sheet to the shot feed tray by overlapping the guidance information with the actual image of the shot feed tray (Step S129). Then, this process is ended.

In case that the shot portion is the image reading unit of the instrument to be operated (Step S130; Yes), the CPU 41 obtains the information relating to the current original reading setting (current one-side/two-side reading setting) of the instrument to be operated, by communicating with the instrument to be operated or by analyzing the image of the operation panel when the operation panel of the instrument to be operated is shot (Step S131). Next, the CPU 41 judges whether the duplex printing is carried out for the printed sheet in accordance with the first image or the image which is subsequently obtained (Step S132). In case that the duplex printing is carried out for the printed sheet (Step S132; Yes), the CPU 41 judges whether the print situation of the printed sheet (the print situation in which the duplex printing is carried out) is matched with the current original reading setting (current one-side/two-side reading setting) of the instrument to be operated (Step S133). In case that the print situation is not matched with the current original reading setting (Step S133; No), the CPU 41 instructs the display unit 31 to display the guidance information for carrying out the switching operation for switching the reading setting (or the printing setting) to the two-side reading setting (or the duplex printing) (Step S134). Then, the process proceeds to Step S137. In case that the print situation is matched with the current original reading setting (Step S133; Yes), the above guidance information is not displayed. Then, the process proceeds to Step S137.

In case that the printing is carried out only for a single surface of the printed sheet (Step S132; No), the CPU 41 judges whether the print situation of the printed sheet (the print situation in which the printing is carried out only for a single surface of the printed sheet) is matched with the current original reading setting (current one-side/two-side reading setting) of the instrument to be operated (Step S135). In case that the print situation is not matched with the current original reading setting (Step S135; No), the CPU 41 instructs the display unit 31 to display the guidance information for carrying out the switching operation for switching the reading setting (or the printing setting) to the one-side reading setting (or the simplex printing) (Step S136). Then, the process proceeds to Step S137. In case that the print situation is matched with the current original reading setting (Step S135; Yes), the above guidance information is not displayed. Then, the process proceeds to Step S137.

In Step S137, the CPU 41 judges whether the next original is set to the image reading unit in accordance with the image which is subsequently obtained by the camera unit 47. When the next original is set (Step S137; Yes) the process returns to Step S130 and is continued.

In case that the next original is not set (Step S137; No), the CPU 41 judges whether a plurality of sheets of the original are set on the platen glass in accordance with the image obtained by the camera unit 47 (Step S138). In case that the sheets are not set (Step S138; No), this process is ended.

In case that a plurality of sheets of the original are set on the platen glass (Step S138; Yes), the CPU 41 judges whether the directions of the set sheets of the original are matched with each other (Step S139). When the directions of the set sheets are matched with each other (Step S139; Yes), this process is ended. When the directions of the set sheets are not matched with each other (Step S139; No), the CPU 41 instructs the display unit 31 to display the guidance information indicating the correct setting direction of the original so as to match the directions of the set sheets with each other (Step S140). Then, this process is ended.

In case that the shot object (the object which the user picks up and watches or the object which the user does not pick up but watches, for example, by moving the user's face close to the object) is a stapler (Step S142 in FIG. 13B), the CPU 41 instructs the display unit 31 to display the guidance information corresponding to the combination of the stapler and the instrument to be operated, which is shot in Step S115.

Figure 15:
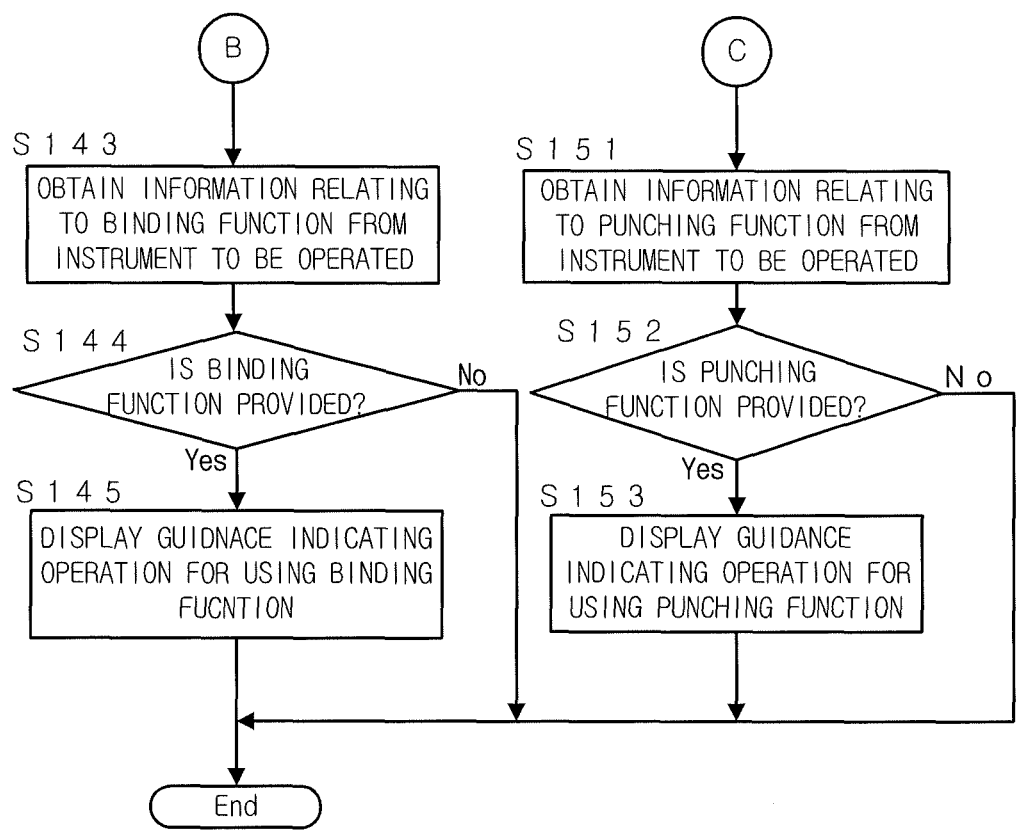
FIG. 15 is a flowchart showing the subsequent process of FIG. 13B.

That is, the CPU 41 specifies the shot instrument to be operated and obtains the information relating to the binding function from the instrument to be operated, via the communication with the instrument to be operated (Step S143 in FIG. 15). In case that the binding function is not provided in the instrument to be operated (Step S144; No), this process is ended. On the other hand, in case that the binding function is provided in the instrument to be operated (Step S144; Yes), the CPU 41 instructs the display unit 31 to display the guidance information indicating the operation for using the binding function of the instrument to be operated (Step S145). Then, this process is ended.

In case that the shot object (the object which the user picks up and watches or the object which the user does not pick up but watches, for example, by moving the user's face close to the object) is a punch machine (Step S150 in FIG. 13B), the CPU 41 instructs the display unit 31 to display the guidance information corresponding to the combination of the punch machine and the instrument to be operated, which is shot in Step S115.

That is, the CPU 41 specifies the shot instrument to be operated and obtains the information relating to the punching function from the instrument to be operated, via the communication with the instrument to be operated (Step S151 in FIG. 15). In case that the punching function is not provided in the instrument to be operated (Step S152; No), this process is ended. On the other hand, incase that the punching function is provided in the instrument to be operated (Step S152; Yes), the CPU 41 instructs the display unit 31 to display the guidance information indicating the operation for using the punching function of the instrument to be operated (Step S153). Then, this process is ended.

Figure 16:
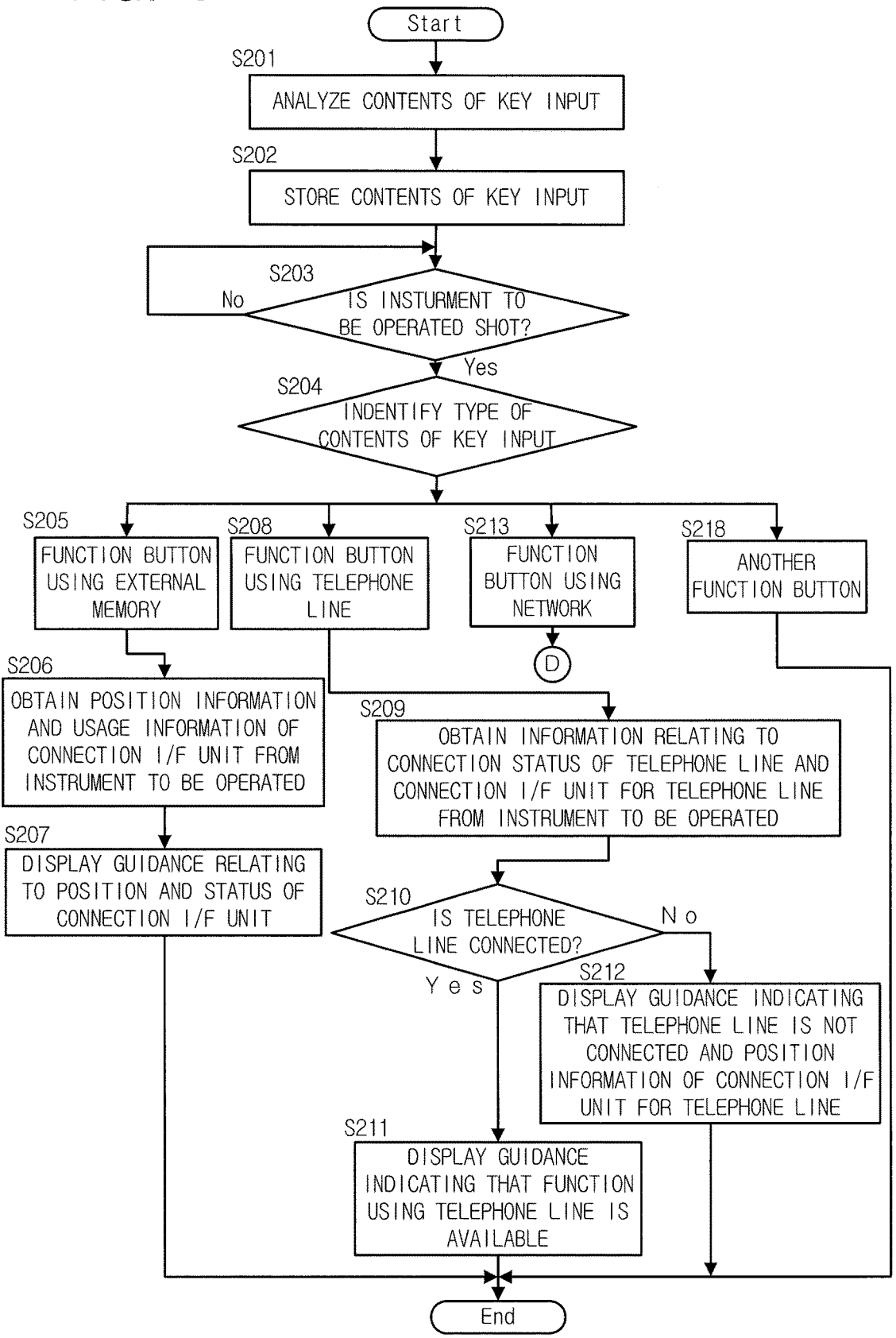
FIG. 16 is a flowchart showing the detail of the key input related process (Step S104 in FIG. 12)
Figure 17:
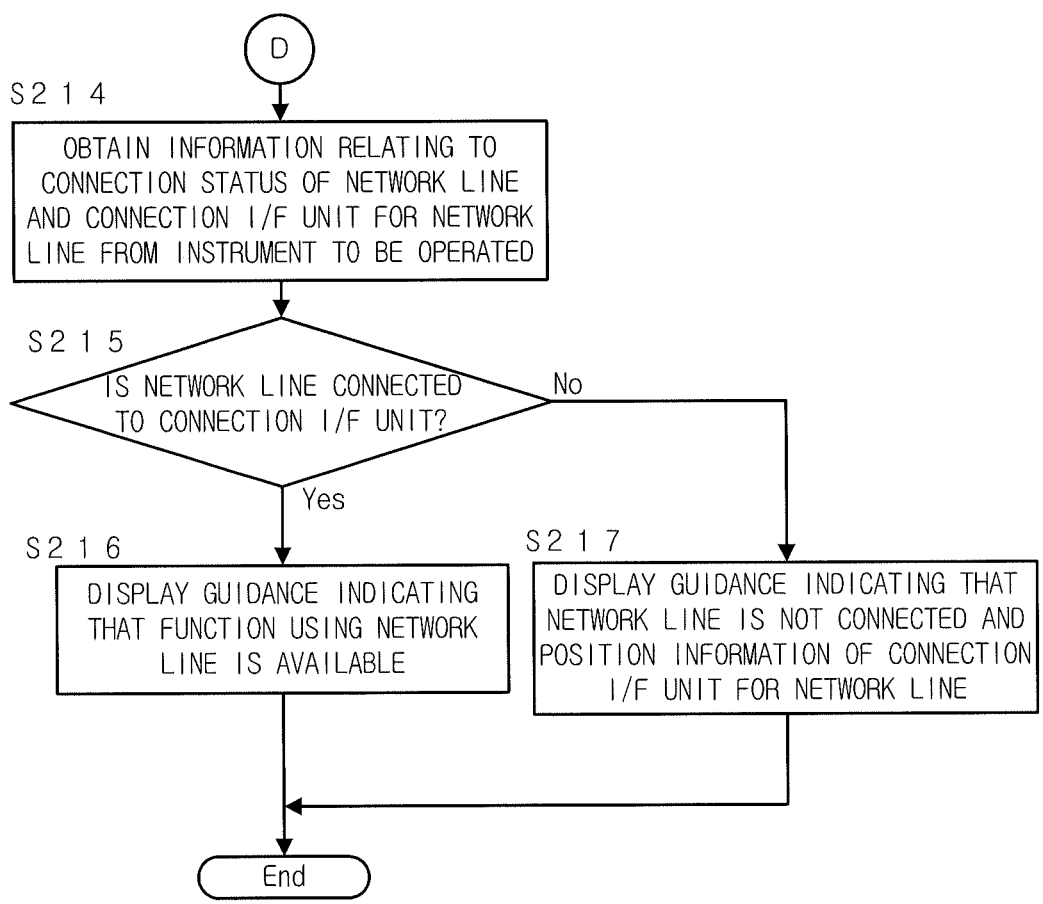
FIG. 17 is a flowchart showing the subsequent process of FIG. 16.

FIG. 16 and FIG. 17 are the flowchart showing the detail of the key input related process (Step S104 in FIG. 12). The CPU 41 analyzes the contents of the key input in accordance with the first image obtained by the camera unit 47 (Step S201), and recognizes the contents of the key input and stores them in the RAM 43 or the like (Step S202). For example, in case that the function button for selecting the function of the instrument is operated, the CPU 41 recognizes and stores the contents of the operated function button. The contents of the key input may be obtained via the communication with the instrument to be operated.

Next, when the instrument to be operated is shot by the camera unit 47 (Step S203; Yes), the CPU 41 identifies the type of the above input (Step S204). In case that the contents of the key input indicate the function button using an external memory (Step S205), the CPU 41 instructs the display unit 31 to display the guidance information corresponding to the combination of the function button and the instrument to be operated, which is shot in Step S203.

That is, the CPU 41 specifies the shot instrument to be operated and obtains the information relating to the position of the connection I/F unit for the external memory in the instrument to be operated and the occupied/unoccupied status of the connection I/F unit via the communication with the instrument to be operated (Step S206). Then, the CPU 41 instructs the display unit 31 to display the guidance information relating to the position of the connection I/F unit for the external memory and the occupied/unoccupied status of the connection I/F unit (Step S207), and this process is ended. The function button using the external memory includes, for example, the function button for the scan to external memory function, the function button for the direct print function, and the like.

In case that the contents of the key input indicate the function button using a telephone line, for example, the function button for selecting the G3 facsimile transmission (Step S208), the CPU 41 instructs the display unit 31 to display the guidance information corresponding to the combination of the function button and the instrument to be operated, which is shot in Step S203. That is, the CPU 41 specifies the shot instrument to be operated, and obtains the information relating to the connection status of the telephone line, the connection I/F unit for the telephone line and the like from the instrument to be operated, via the communication with the instrument to be operated (Step S209).

Then, for example, the CPU 41 judges whether the telephone line is connected to the connection I/F unit for the telephone line, in accordance with the obtained information (Step S210). In case that the telephone line is connected to the connection I/F unit (Step S210; Yes), the CPU 41 instructs the display unit 31 to display the guidance information indicating that the function using the telephone line is available, by overlapping the guidance information with the actual image of the shot instrument to be operated (Step S211). Then, this process is ended. In case that the telephone line is not connected to the connection I/F unit for the telephone line (Step S210; No), the CPU 41 instructs the display unit 31 to display the guidance information indicating that the telephone line is not connected to the connection I/F unit for the telephone line, the position of the connection I/F unit for the telephone line and the like (Step S212). Then, this process is ended.

In case that the contents of the key input indicate the function button using a network line, for example, the function button for selecting the Internet facsimile transmission (Step S213), the CPU 41 instructs the display unit 31 to display the guidance information corresponding to the combination of the function button and the instrument to be operated, which is shot in Step S203.

That is, the CPU 41 specifies the shot instrument to be operated, and obtains the information relating to the connection status of the network line, the connection I/F unit for the network line and the like from the instrument to be operated, via the communication with the instrument to be operated (Step S214 in FIG. 17). Then, for example, the CPU 41 judges whether the network line is connected to the connection I/F unit for the network line, in accordance with the obtained information (Step S215). In case that the network line is connected to the connection I/F unit (Step S215; Yes), the CPU 41 instructs the display unit 31 to display the guidance information indicating that the function using the network line is available, by overlapping the guidance information with the actual image of the shot instrument to be operated (Step S216). Then, this process is ended.

In case that the network line is not connected to the connection I/F unit (Step S215; No), the CPU 41 instructs the display unit 31 to display the guidance information indicating that the network line is not connected to the connection I/F unit for the network line, the position of the connection I/F unit for the network line and the like (Step S217). Then, this process is ended.

In case that the contents of the key input indicate another function button (Step S218 in FIG. 16), the guidance information is not displayed. Then, this process is ended.

Figure 18:
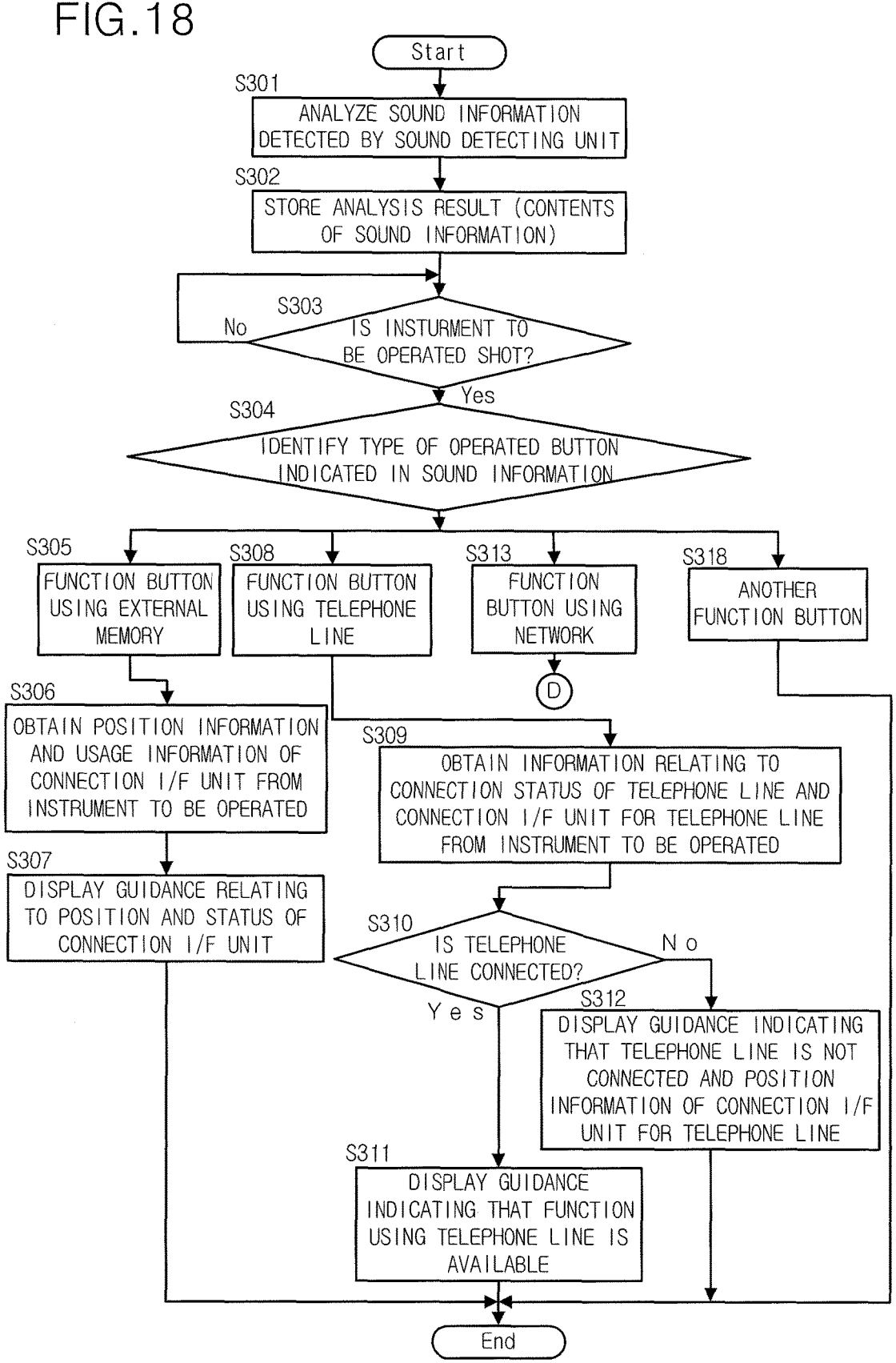
FIG. 18 is a flowchart showing the detail of the sound input related process (Step S105 in FIG. 12).

FIG. 18 is the flowchart showing the detail of the sound input related process (Step S105 in FIG. 12). The CPU 41 analyzes the sound information detected by the sound detecting unit 53 (Step S301), and recognizes the analysis result (the contents of the sound information) and store it in the RAM 43 or the like (Step S302). For example, in case that the sound instruction for selecting the function button is input, the CPU 41 recognizes and stores the contents of the instruction.

Next, the instrument to be operated is shot by the camera unit 47 (Step S303; Yes), the CPU 41 identifies the type of the above contents of the sound information (Step S304). In case that the contents of the sound information indicate the instruction for selecting the function button using an external memory (Step S305), the CPU 41 instructs the display unit 31 to display the guidance information corresponding to the combination of the above function button and the instrument to be operated, which is shot in Step S303.

That is, the CPU 41 specifies the shot instrument to be operated and obtains the information relating to the position of the connection I/F unit for the external memory in the instrument to be operated and the occupied/unoccupied status of the connection I/F unit via the communication with the instrument to be operated (Step S306). Then, the CPU 41 instructs the display unit 31 to display the guidance information relating to the position of the connection I/F unit for the external memory and the occupied/unoccupied status of the connection I/F unit (Step S307), and this process is ended.

In case that the contents of the sound information indicate the instruction for selecting the function button using a telephone line (for example, the function button for the G3 facsimile transmission) (Step S308), the CPU 41 instructs the display unit 31 to display the guidance information corresponding to the combination of the above function button and the instrument to be operated, which is shot in Step S303.

That is, the CPU 41 specifies the shot instrument to be operated, and obtains the information relating to the connection status of the telephone line, the connection I/F unit for the telephone line and the like from the instrument to be operated, via the communication with the instrument to be operated (Step S309). Then, for example, the CPU 41 judges whether the telephone line is connected to the connection I/F unit for the telephone line, in accordance with the obtained information (Step S310).

In case that the telephone line is connected to the connection I/F unit (Step S310; Yes), the CPU 41 instructs the display unit 31 to display the guidance information indicating that the function using the telephone line is available, by overlapping the guidance information with the actual image of the shot instrument to be operated (Step S311). Then, this process is ended. In case that the telephone line is not connected to the connection I/F unit for the telephone line (Step S310; No), the CPU 41 instructs the display unit 31 to display the guidance information indicating that the telephone line is not connected to the connection I/F unit for the telephone line, the position of the connection I/F unit for the telephone line and the like (Step S312). Then, this process is ended.

In case that the contents of the sound information indicate the instruction for selecting the function button using a network line (for example, the function button for the Internet facsimile transmission) (Step S313 in FIG. 18), the CPU 41 instructs the display unit 31 to display the guidance information corresponding to the combination of the above function button and the instrument to be operated, which is shot in Step S303.

That is, the CPU 41 specifies the shot instrument to be operated, and obtains the information relating to the connection status of the network line, the connection I/F unit for the network line and the like from the instrument to be operated, via the communication with the instrument to be operated (Step S214 in FIG. 17). Then, for example, the CPU 41 judges whether the network line is connected to the connection I/F unit for the network line, in accordance with the obtained information (Step S215).

In case that the network line is connected to the connection I/F unit (Step S215; Yes), the CPU 41 instructs the display unit 31 to display the guidance information indicating that the function using the network line is available, by overlapping the guidance information with the actual image of the shot instrument to be operated (Step S216). Then, this process is ended. In case that the network line is not connected to the connection I/F unit (Step S215; No), the CPU 41 instructs the display unit 31 to display the guidance information indicating that the network line is not connected to the connection I/F unit for the network line, the position of the connection I/F unit for the network line and the like (Step S217). Then, this process is ended.

In case that the contents of the sound information indicate the instruction for selecting another function button, or the like (Step S314 in FIG. 18), the guidance information is not displayed. Then, this process is ended.

As described above, in the guidance information display device (the head-mounted display device 30 and the portable terminal 60) according to the embodiment, the user's intention is recognized by detecting the user's specific action. Further, when the instrument to be operated is shot by the camera unit, the guidance information corresponding to the combination of the detected specific action and the shot instrument to be operated, is provided to the user. Therefore, it is possible to provide the suitable guidance information to the user at the suitable timing.

Further, because the guidance information display device obtains the information related to the detected specific action via the communication with the shot instrument to be operated and displays the guidance information in accordance with the obtained information, it is possible to use the guidance information which is matched with the current state of the instrument to be operated.

Further, because the guidance information display device displays the guidance information corresponding to the combination of the detected specific action and the shot portion (part) of the instrument to be operated, it is possible to specify the more detailed user's intention and to provide the suitable guidance information corresponding to the detailed intention.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the above embodiment, the case in which the image processing apparatus 10 is shot as the instrument to be operated, is explained. In case that another instrument to be operated is shot, the guidance information corresponding to the combination of the above shot instrument to be operated and the detected specific action is displayed. That is, even though the detected specific action is identical, the guidance information to be displayed is changed according to the shot instrument to be operated. For example, in case that the instrument to be operated, which is shot after the specific action in which the user picks up and watches an external memory is detected, is the PC 6, the guidance information relating to the connection I/F unit for the external memory in the PC 6, is displayed.

Further, in case that after the specific action in which the user picks up and the watches an original for which the duplex printing is carried out, is detected, the image reading device 4 which does not have the function of automatically reading both surfaces of the original is shot as the instrument to be operated, the guidance information relating to the operation for manually reading the above original by turning over the original, or the guidance information for recommending that the user uses another instrument (for example, the image processing apparatus 10) having the function of automatically reading both surfaces of the original, may be displayed.

In the above embodiment, as the instrument to be operated, the image processing apparatus 10, the image reading device 4 and the PC 6 are exemplified. However, the instrument to be operated may be another instrument. Further, the instrument to be operated may be limited to a specific one instrument. For example, the instrument to be operated may be limited to only the image processing apparatus 10. In this case, after the specific action is detected, the guidance information related to the detected specific action is displayed at the timing of shooting the image processing apparatus 10. Therefore, it is possible to provide the guidance information at the suitable timing. Further, in this case, by switching the guidance information to be displayed according to the shot portion of the image processing apparatus 10 or the state of the image processing apparatus 10, it is possible to provide more effective information to the user.

In the above embodiment, the head-mounted display device 30 in which the image is overlapped with the outside scene by using the half mirrors 35, is used. However, a VR (Virtual Reality) type of head-mounted display may be used. In the VR type of head-mounted display, when the user wears the head-mounted display, the user cannot look at the outside scene and can look at only the projected image. In this case, like the portable terminal 60, the image obtained by combining the guidance information with the camera image may be displayed.

One of the objects of the above embodiment is to provide a guidance information display device which can display the information which is useful for a user who uses the instrument at the suitable timing.

In the embodiment, when the specific action is detected and the specific instrument to be operated is shot by the camera unit, the guidance information corresponding to the combination of the detected specific action and the shot instrument to be operated is displayed.

In the embodiment, the guidance information is provided in accordance with the detected specific action and the state of the shot instrument to be operated or the shot portion of the instrument to be operated. Therefore, even though the detected specific action is identical, the guidance information which is different according to the state of the shot instrument to be operated or the shot portion of the instrument is displayed.

In the embodiment, for example, the specific key input carried out to the operating unit of the instrument to be operated is detected by analyzing the image obtained by the camera unit. Alternatively, the contents of the key input are obtained via the communication with the instrument to be operated.

In the embodiment, the gesture in which the user picks up a certain object or the user carries out a certain action by picking up the object, is detected as the specific action.

In the embodiment, the guidance information display device recognizes the user's intention from the sound information output from the user.

In the embodiment, in case that the specific action in which the user picks up or watches (gazes at) an external memory is detected and the instrument comprising the connection I/F unit for the external memory is shot by the camera unit, the guidance information display device obtains the information relating to the connection I/F unit for the external memory, for example, the information indicating the position of the communication I/F unit and/or the usage status of the communication I/F unit, via the communication with the shot instrument to be operated, and provides the guidance information in accordance with the obtained information.

In the embodiment, for example, in case that there are a plurality of connection I/F unit, the position of the unoccupied connection I/F unit or the like is displayed as the guidance information.

In the embodiment, in case that the specific action in which the user picks up or watches a blank sheet is detected and the image forming apparatus is shot by the camera unit, the position of the feed tray which is matched with the size of the blank sheet is displayed as the guidance information.

In the embodiment, in case that the specific action in which the user picks up or watches an original for which the duplex printing is carried out is detected and the reading device having the function of optically reading both surfaces of a sheet is shot, the guidance information relating to the setting for reading both surfaces of the original is displayed.

In the embodiment, only when the print situation of the original which the user picks up or watches is not matched with the one-side/two-side reading setting of the reading device, the guidance information relating to the switching of the one-side/two-side reading setting is displayed.

In the embodiment, in case that the action in which the user picks up or watches a letter head sheet is detected as the specific action and the feed tray of the image forming apparatus having the function of printing an image on the sheet is shot, the guidance information relating to the correct setting of the letter head sheet to the shot feed tray is displayed.

In the embodiment, in case that the specific action in which the user intends to arrange two sheets of an original in order on the platen glass, the guidance information display device specifies the direction of the first sheet of the original set on the platen glass, in accordance with the image obtained by the camera unit when the above specific action is detected, and displays the guidance information relating to the method for setting the second sheet of the original so as to match the direction of the second sheet with the direction of the first sheet of the original.

In the embodiment, in case that the action in which the user picks up or watches a stapler or a clip is detected as the specific action and the image forming apparatus having the function of printing an image on the sheets is shot, the guidance information display device judges whether the sheets can be bound by the shot image forming apparatus. When the guidance information display device judges that the sheets can be bound by the image forming apparatus, the guidance information display device displays the guidance information relating to the function of binding the sheets in the image forming apparatus.

In the embodiment, in case that the action in which the user picks up or watches a punch machine is detected as the specific action and the image forming apparatus having the function of printing an image on the sheet is shot, the guidance information display device judges whether the sheet can be punched by the shot image forming apparatus. When the guidance information display device judges that the sheet can be punched by the image forming apparatus, the guidance information display device displays the guidance information relating to the punching function of the image forming apparatus.

In the embodiment, the guidance information is displayed by overlapping the guidance information with the actual image of the instrument to be operated (the image of the instrument to be operated, which is obtained by the camera unit and is displayed on the display unit, or the actual instrument to be operated, which is watched through the half mirror). Preferably, the guidance information is displayed by adjusting the display position and the direction of the guidance information to the position and the direction of the instrument to be operated.

According to the above guidance information display device, it is possible to display the information which is useful for a user who uses the instrument at the suitable timing.

The present U.S. patent application claims the priority of Japanese Patent Application No. 2012-244593, filed on Nov. 6, 2012, according to the Paris Convention, and the entirety of which is incorporated herein by reference for correction of incorrect translation.

What is claimed is:

1. A guidance information display device, comprising:
a portable terminal or a head-mounted display device, comprising:
    a display;
    a camera;
    an action detecting processor that detects a predetermined user's action as a specific action of the user on a real object based on an image shot by the camera; and
    a controller that instructs the display, when the action detecting processor detects the specific action as the camera shoots the real object and when the camera shoots a specific instrument, to display guidance information corresponding to a combination of the detected specific action and the specific instrument shot by the camera,
wherein the specific instrument is different from the real object, and the real object is different from the action detecting processor,
wherein the real object is for use by the specific instrument based on the detected specific action, and
wherein the specific instrument is an image forming apparatus or an image reading apparatus.

2. The guidance information display device of claim 1, wherein the controller instructs the display to display the guidance information corresponding to the combination of the detected specific action and the specific instrument shot by the camera in accordance with a state of the specific instrument or a portion of the specific instrument shot by the camera.

3. The guidance information display device of claim 2, further comprising a communication processor that obtains information relating to the state of the specific instrument.

4. The guidance information display device of claim 3, wherein, when the specific action is the user picking up or watching an external memory and when the specific instrument comprises a connection I/F unit for the external memory, the communication processor obtains information relating to the connection I/F unit of the specific instrument and the controller instructs the display to display the guidance information in accordance with the obtained information relating to the connection I/F unit.

5. The guidance information display device of claim 4, wherein communication processor obtains information relating to a status of the connection I/F unit and the controller instructs the display to display, as the guidance information, the information relating to the connection I/F unit available for connection of the external memory picked up or watched by the user.

6. The guidance information display device of claim 2, wherein the controller recognizes the state of the specific instrument in accordance with an image of the specific instrument.

7. The guidance information display device of claim 1, wherein the action detecting processor detects the specific action in accordance with an image obtained by the camera.

8. The guidance information display device of claim 7, wherein the specific action is a specific gesture of the user.

9. The guidance information display device of claim 7, wherein, when the specific action is the user picking up or watching a blank sheet and when the specific instrument is an image forming apparatus having a function of printing an image on the blank sheet, the controller instructs the display to display information indicating a position of a feed tray matched with a size of the blank sheet as the guidance information.

10. The guidance information display device of claim 7, wherein, when the specific action is the user picking up or watching an original for which a duplex printing is carried out and when the specific instrument is a reading device having a function of optically reading both surfaces of a sheet, the controller instructs the display to display the guidance information relating to a setting for reading both surfaces of the original.

11. The guidance information display device of claim 7, wherein, when the specific action is the user picking up or watching an original and when the specific instrument is a reading device having a function of optically reading both surfaces of a sheet, only when a print situation of the original is not matched with a one-side/two-side reading setting of the reading device, the controller instructs the display to display the guidance information relating to a switching of the one-side/two-side reading setting.

12. The guidance information display device of claim 7, wherein
the controller instructs the display to display the guidance information corresponding to the combination of the detected specific action and the specific instrument shot by the camera in accordance with a portion of the specific instrument; and when the specific action is the user picking up or watching a letter head sheet and when the specific instrument is an image forming apparatus having a function of printing an image on the letter head sheet, and when the shot portion of the image forming apparatus is a feed tray of the image forming apparatus, the controller instructs the display to display the guidance information relating to a correct setting of the letter head sheet to the feed tray.

13. The guidance information display device of claim 7, wherein,
when the specific action is the user arranging two sheets of an original in order on a platen glass of a reading device having a function of optically reading the original and
when the specific instrument is the reading device, the controller instructs the display device to display the guidance information relating to a method for setting a second sheet of the original so as to match a direction of the second sheet with a direction of a first sheet of the original according to the direction of the first sheet shot by the camera when the specific action is detected.

14. The guidance information display device of claim 7, wherein
when the specific action is the user picking up or watching a stapler or a clip and when the specific instrument is an image forming apparatus having a function of printing an image on sheets, the controller judges whether the sheets can be bound by the image forming apparatus, and
when the controller judges that the sheets can be bound by the image forming apparatus, the controller instructs the display device to display the guidance information relating to a function of binding the sheets in the image forming apparatus.

15. The guidance information display device of claim 7, wherein
when the specific action is the user picking up or watching a punch machine and when the specific instrument is an image forming apparatus having a function of printing an image on a sheet, the controller judges whether the sheet can be punched by the image forming apparatus, and
when the controller judges that the sheet can be punched by the image forming apparatus, the controller instructs the display to display the guidance information relating to a punching function of the image forming apparatus.

16. The guidance information display device of claim 1, wherein the specific action is a specific input operation carried out for an operating unit of the specific instrument.

17. The guidance information display device of claim 1, wherein the action detecting processor comprises a sound detecting processor that detects specific sound information as the specific action.

18. The guidance information display device of claim 1, wherein
the display is a head-mounted display in which an image is overlapped with an outside scene by using a half mirror, and
the camera is provided in the head-mounted display.

19. The guidance information display device of claim 1, wherein the controller instructs the display to display the guidance information by overlapping the guidance information with an actual image of the specific instrument.

20. The guidance information display device of claim 1, wherein the action detecting processor detects the specific action independent of the specific instrument.

21. The guidance information display device of claim 1, wherein the controller instructs the display, when the action detecting processor detects the specific action and when the camera shoots the specific instrument, to display the guidance information corresponding to the combination of the real object and the specific instrument.

22. The guidance information display device of claim 21, wherein
the controller instructs the display, when the action detecting processor detects the specific action and when the camera shoots the specific instrument and the real object, to display the guidance information corresponding to the combination of the real object and the specific instrument.

23. The guidance information display device of claim 1, wherein the real object is used in the specific instrument.

24. The guidance information display device of claim 1, wherein
the controller instructs the display, when the camera shoots the specific instrument after the action detecting processor detects the specific action, to display the guidance information corresponding to the combination of the detected specific action and the specific instrument shot by the camera.

25. The guidance information display device of claim 1, wherein the real object is at least one selected from a group consisting of: an external memory, a sheet of paper, a stapler, and a punch machine.

26. The guidance information display device of claim 1, wherein the real object is for use by the specific instrument based on the detected specific action after the display displays the guidance information.

27. The guidance information display device of claim 1, wherein the real object is set to the specific instrument.

28. A non-transitory computer readable storage medium storing a computer executable program for implementing controlling operations in a guidance information display device comprising a portable terminal or a head-mounted display device comprising: a display; a camera; an action detecting processor that detects a predetermined user's action as a specific action of the user on a real object based on an image shot by the camera; and a controller, the program being executable by a computer to cause the computer to perform a process comprising:
instructing the display, when the action detecting processor detects the specific action as the camera shoots the real object and when the camera shoots a specific instrument,
displaying guidance information corresponding to a combination of the detected specific action and the specific instrument shot by the camera,
wherein the specific instrument is different from the real object and the real object is different from the action detecting processor,
wherein the real object is for use by the specific instrument based on the detected specific action, and
wherein the specific instrument is an image forming apparatus or an image reading apparatus.

* * * * *